(12) United States Patent
Owen et al.

(10) Patent No.: US 6,950,438 B1
(45) Date of Patent: Sep. 27, 2005

(54) SYSTEM AND METHOD FOR IMPLEMENTING A SEPARATE VIRTUAL CHANNEL FOR POSTED REQUESTS IN A MULTIPROCESSOR COMPUTER SYSTEM

(75) Inventors: Jonathan M. Owen, Northborough, MA (US); Mark D. Hummel, Franklin, MA (US); James B. Keller, Redwood City, CA (US)

(73) Assignees: Advanced Micro Devices, Inc., Sunnyvale, CA (US); Alpha Processor, Inc., Concord, MA (US)

( * ) Notice: Subject to any disclaimer, the term of this patent is extended or adjusted under 35 U.S.C. 154(b) by 1008 days.

(21) Appl. No.: 09/640,602

(22) Filed: Aug. 17, 2000

Related U.S. Application Data

(63) Continuation-in-part of application No. 09/398,624, filed on Sep. 17, 1999, and a continuation-in-part of application No. 09/399,281, filed on Sep. 17, 1999.

(51) Int. Cl.$^7$ ................................................ H04L 12/00
(52) U.S. Cl. ...................................... 370/409; 370/464
(58) Field of Search ................................. 370/412, 413, 370/415, 417, 409, 352, 355, 389, 406, 428, 429

(56) References Cited

U.S. PATENT DOCUMENTS

| | | |
|---|---|---|
| 5,495,619 A | 2/1996 | May et al. |
| 5,533,198 A | 7/1996 | Thorson |
| 5,583,990 A | 12/1996 | Birrittella et al. |
| 5,613,129 A | 3/1997 | Walsh ........................ 395/740 |
| 5,659,796 A | 8/1997 | Thorson et al. |
| 5,748,900 A | 5/1998 | Scott et al. |
| 5,749,095 A | 5/1998 | Hagersten |
| 5,754,789 A | 5/1998 | Nowatzyk et al. |
| 5,797,035 A | 8/1998 | Birrittella et al. |
| 5,848,068 A | 12/1998 | Daniel et al. |
| 5,850,395 A | 12/1998 | Hauser et al. |
| 5,870,384 A | 2/1999 | Salovuori et al. |

(Continued)

FOREIGN PATENT DOCUMENTS

| | | |
|---|---|---|
| EP | 841 617 | 5/1998 |
| GB | 0953913 A1 | 11/1999 |
| GB | 2 360 168 | 9/2001 |
| WO | WO 93 23810 | 11/1993 |

OTHER PUBLICATIONS

Gaughan et al. "Distrbuted, Deadlock–Free Routing in Faulty, Pipelined, Direct Interconnect Networks". IEEE. Jun. 1996. pp. 651–665.*

"Performance Analysis of Mesh Interconnection Networks with Deterministic Routing," Adve, et al., 1995, pp. 1–40.

*Primary Examiner*—Chi Pham
*Assistant Examiner*—Derrick W Ferris
(74) *Attorney, Agent, or Firm*—Lawrence J. Merkel; Meyertons, Hood, Kivlin, Kowert, Goetzel, P.C.

(57) ABSTRACT

A computer system employs virtual channels and allocates different resources to the virtual channels. More particularly, the computer system provides a posted commands virtual channel separate from the non-posted commands virtual channel for routing posted and non-posted commands or requests through coherent and noncoherent fabrics within the computer system. Because separate resources are allocated to the virtual channels in the computer system, posted requests may be allowed to become unordered with other requests from the same source. Implementation of a separate posted commands virtual channel may allow the computer system to maintain compatibility with I/O systems in which posted write requests may become unordered with previous posted requests (e.g., the Peripheral Component Interconnect Bus, or PCI). Implementation of the separate posted commands virtual channel thus may assist in providing deadlock-free operation.

31 Claims, 22 Drawing Sheets

Virtual Channels

| Virtual Channel | Applicable Links |
|---|---|
| Posted Commands | Coherent and NonCoherent |
| Non-Posted Commands | Coherent and NonCoherent |
| Responses | Coherent and NonCoherent |
| Probes | Coherent Only |

42

U.S. PATENT DOCUMENTS

| | | | |
|---|---|---|---|
| 5,892,923 A * | 4/1999 | Yasuda et al. ............... 709/239 |
| 5,936,956 A | 8/1999 | Naven |
| 6,005,851 A | 12/1999 | Craddock et al. |
| 6,014,690 A | 1/2000 | VanDoren et al. |
| 6,055,618 A | 4/2000 | Thorson ....................... 712/11 |
| 6,094,686 A | 7/2000 | Sharma |
| 6,101,420 A | 8/2000 | VanDoren et al. |
| 6,122,700 A | 9/2000 | McCoy ........................ 710/260 |
| 6,157,968 A | 12/2000 | Horst et al. |
| 6,205,508 B1 | 3/2001 | Bailey et al. |
| 6,243,781 B1 * | 6/2001 | Gandhi et al. ............... 710/313 |
| 6,256,674 B1 | 7/2001 | Manning et al. |
| 6,370,600 B1 | 4/2002 | Hughes et al. |
| 6,370,621 B1 | 4/2002 | Keller |
| 6,389,526 B1 | 5/2002 | Keller et al. |
| 6,426,957 B1 | 7/2002 | Hauser et al. |
| 6,484,220 B1 | 11/2002 | Alvarez, II et al. |
| 6,715,055 B1 | 3/2004 | Hughes |
| 2001/0044874 A1 | 11/2001 | Watanabe et al. |
| 2001/0051977 A1 | 12/2001 | Hagersten |

* cited by examiner

| Bit Time | 7 | 6 | 5 | 4 | 3 | 2 | 1 | 0 |
|---|---|---|---|---|---|---|---|---|
| 0 | RSV | | CMD[5:0] | | | | | |
| 1 | RespData [1:0] | | Response [1:0] | | PostCmd Data[1:0] | | PostCmd [1:0] | |
| 2 | RSV | | Probe [1:0] | | NonPost Data[1:0] | | NonPost Cmd[1:0] | |
| 3 | RSV | | | | | | | |

180

| Bit Time | 7 | 6 | 5 | 4 | 3 | 2 | 1 | 0 |
|---|---|---|---|---|---|---|---|---|
| 0 | | | CMD[5:0] | | | | | |
| 1 | | | | | | | | |
| 2 | | | | | | | | |
| 3 | | | | | | | | |

| Bit Time | 7 | 6 | 5 | 4 | 3 | 2 | 1 | 0 |
|---|---|---|---|---|---|---|---|---|
| 0 | Src Unit[1:0] | | CMD[5:0] | | | | | |
| 1 | DestNode[2:0] | | | DestUnit[1:0] | | SrcNode[2:0] | | |
| 2 | | | | SrcTag[4:0] | | | | |
| 3 | Addr[7:2] | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | Src Unit [1:0] | | CMD[5:0] | | | | | |
| 1 | DestNode[2:0] | | | Dest Unit[1:0] | | SrcNode[2:0] | | |
| 2 | | | | SrcTag[4:0] | | | | |
| 3 | Sh | | | | | | | |

FIG. 5

| Bit Time | 7 | 6 | 5 | 4 | 3 | 2 | 1 | 0 |
|---|---|---|---|---|---|---|---|---|
| 0 | Data[7:0] | | | | | | | |
| 1 | Data[15:8] | | | | | | | |
| 2 | Data[23:16] | | | | | | | |
| 3 | Data[31:24] | | | | | | | |
| 4 | Data[39:32] | | | | | | | |
| 5 | Data[47:40] | | | | | | | |
| 6 | Data[55:48] | | | | | | | |
| 7 | Data[63:56] | | | | | | | |

FIG. 6

| CMD Code | VChan | Command | Packet Type |
|---|---|---|---|
| 000000 | - | Nop | Info |
| 000001 | NPC | VicBlk | Request/Address/Data |
| 000010 | - | Reserved | - |
| 000011 | NPC | ValidateBlk | Request/Address |
| 000100 | NPC | RdBlk | Request/Address |
| 000101 | NPC | RdBlkS | Request/Address |
| 000110 | NPC | RdBlkMod | Request/Address |
| 000111 | NPC | ChangeToDirty | Request/Address |
| x01xxx | NPC or PC | Wr(Sized) | Request/Address/Data |
| 01xxxx | NPC | Read(Sized) | Request/Address |
| 100xxx | - | Reserved | - |
| 110000 | R | RdResponse | Response/Data |
| 110001 | R | ProbeResp | Response |
| 110010 | R | TgtStart | Response |
| 110011 | R | TgtDone | Response |
| 110100 | R | SrcDone | Response |
| 110101 | R | MemCancel | Response |
| 11011x | - | Reserved | - |
| 11100x | P | Probe | Request/Address |
| 11101x | P | Broadcast | Request/Address |
| 11110x | - | Reserved | - |
| 111110 | - | Reserved | - |
| 111111 | - | Sync | Info |

Virtual Channels

| Virtual Channel | Applicable Links |
|---|---|
| Posted Commands | Coherent and NonCoherent |
| Non-Posted Commands | Coherent and NonCoherent |
| Responses | Coherent and NonCoherent |
| Probes | Coherent Only |

42

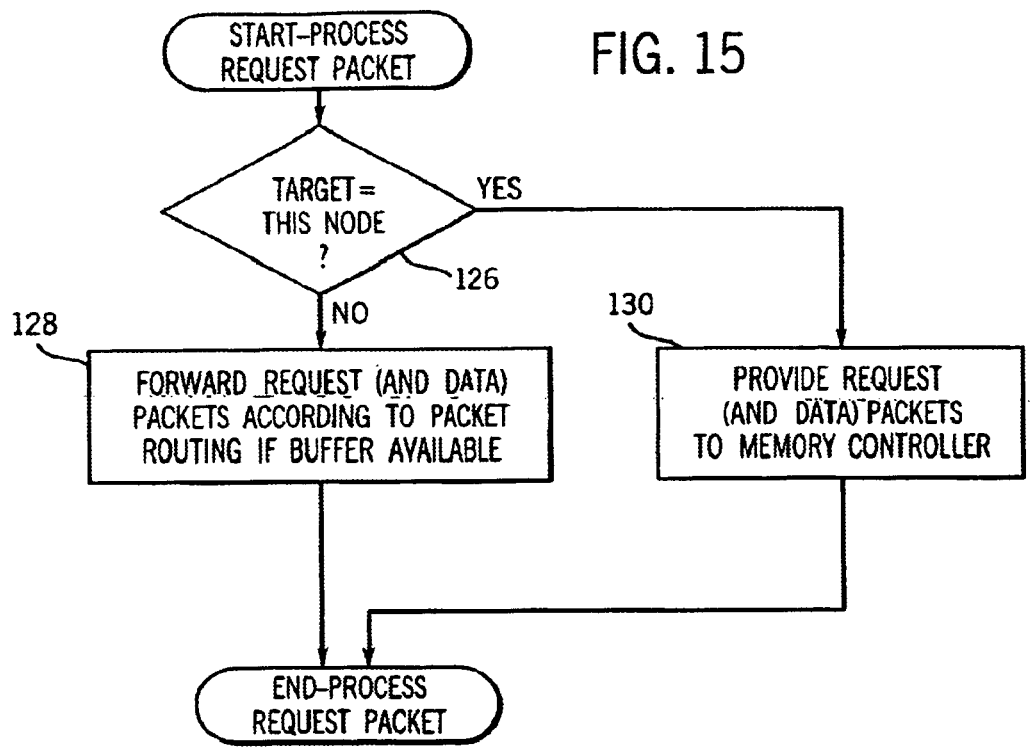
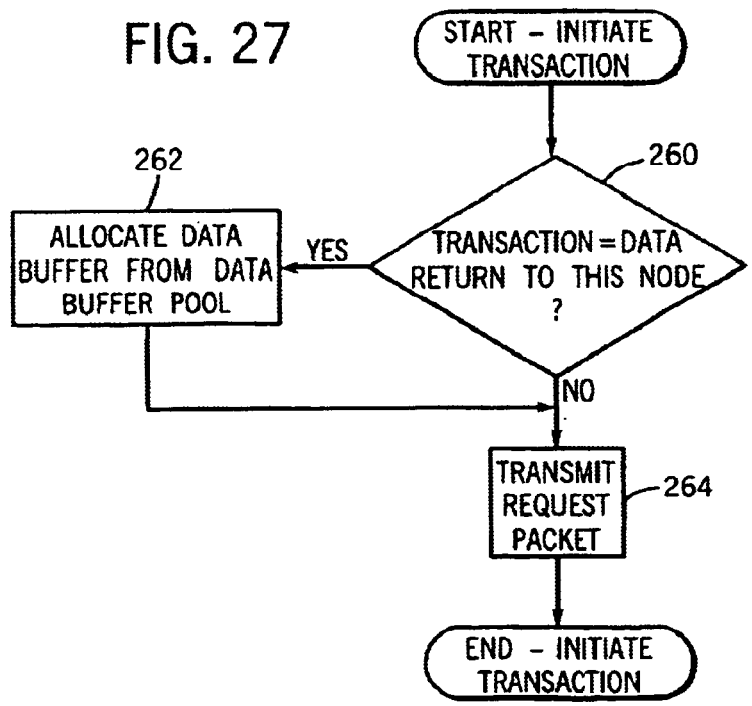

| CMD Code | VChan | Command | Packet Type |
|---|---|---|---|
| 000000 | - | Nop | Info |
| 000001 | - | Reserved | - |
| 000010 | NPC | Flush | Request |
| 000011 | - | Reserved | - |
| 0001xx | - | Reserved | - |
| x01xxx | NPC or PC | Wr(Sized) | Request/Address/Data |
| 01xxxx | NPC | Read(Sized) | Request/Address |
| 100xxx | - | Reserved | - |
| 110000 | R | RdResponse | Response/Data |
| 110001 | - | Reserved | - |
| 110010 | - | Reserved | - |
| 110011 | R | TgtDone | Response |
| 11010x | - | Reserved | - |
| 11011x | - | Reserved | - |
| 11100x | - | Reserved | - |
| 11101x | PC or NPC | Broadcast | Request/Address |
| 111100 | PC | Fence | Request |
| 111101 | - | Reserved | - |
| 111110 | - | Reserved | - |
| 111111 | - | Sync | Info |

| Bit Time | 7 | 6 | 5 | 4 | 3 | 2 | 1 | 0 |
|---|---|---|---|---|---|---|---|---|
| 0 | SeqID[3:2] | | CMD[5:0] | | | | | |
| 1 | Pass PW | SeqID[1:0] | | UnitID[4:0] | | | | |
| 2 | | | | SrcTag[4:0] | | | | |
| 3 | Addr[7:2] | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

FIG. 21

| Bit Time | 7 | 6 | 5 | 4 | 3 | 2 | 1 | 0 |
|---|---|---|---|---|---|---|---|---|
| 0 | | | CMD[5:0] | | | | | |
| 1 | Pass PW | | | UnitID[4:0] | | | | |
| 2 | | | | SrcTag[4:0] | | | | |
| 3 | | | | | | | | |

FIG. 22

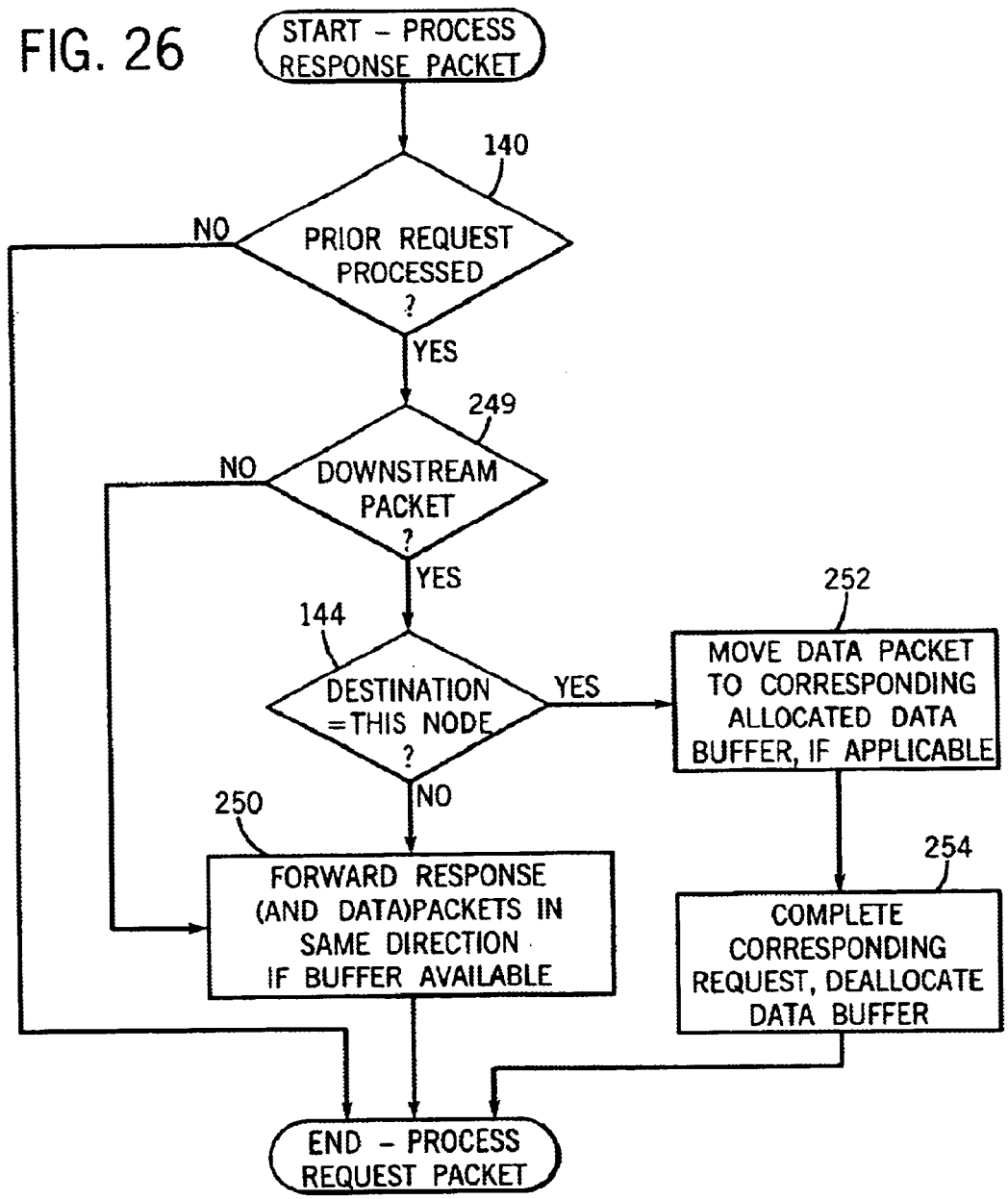

FIG. 28

| Request₁ TYPE | Request₂ TYPE | WAIT REQUIREMENTS |
|---|---|---|
| MEMORY WRITE | MEMORY WRITE | 1. Req₂ MUST WAIT FOR TgtStart₁.<br>2. SrcDone₂ MUST WAIT FOR TgtDone₁.<br>3. TgtDone₂ ON THE NON-COHERENT LINK (IF REQUIRED) MUST WAIT FOR TgtDone₁. |
| MEMORY WRITE | MEMORY READ | 1. Req₂ MUST WAIT FOR TgtStart₁.<br>2. TgtDone₂ ON THE NON-COHERENT LINK MUST WAIT FOR TgtDone₁. |
| MEMORY READ | MEMORY REQUEST | Req₂ MUST WAIT FOR TgtStart₁. |
| MEMORY WRITE | I/O REQUEST OR INTERRUPT | Req₂ MUST WAIT FOR TgtStart₁. |
| MEMORY READ | I/O REQUEST | Req₂ MUST WAIT FOR TgtStart₁. |
| MEMORY WRITE | FLUSH | TgtDone₂ ON THE NON-COHERENT LINK MUST WAIT FOR TgtDone₁. (FLUSH DOES NOT CAUSE ANY REQUESTS TO BE ISSUED TO THE COHERENT FABRIC.) |
| MEMORY READ | FLUSH OR INTERRUPT | NO WAIT REQUIREMENTS |
| MEMORY WRITE | RESPONSE | Response₂ MUST WAIT FOR TgtDone₁. |
| MEMORY READ | RESPONSE | Response₂ MUST WAIT FOR TgtStart₁. |
| I/O REQUEST | MEMORY REQUEST | Req₂ MUST WAIT FOR TgtStart₁. |
| I/O REQUEST | I/O REQUEST OR INTERRUPT | Req₂ MUST WAIT FOR TgtStart₁. |
| I/O REQUEST | FLUSH | TgtDone₂ ON THE NON-COHERENT LINK MUST WAIT FOR TgtStart₁. (FLUSH DOES NOT CAUSE ANY REQUESTS TO BE ISSUED TO THE COHERENT FABRIC.) |
| I/O REQUEST | RESPONSE | Response₂ MUST WAIT FOR TgtStart₁. |
| FLUSH | ANYTHING | NO WAIT REQUIREMENTS |
| RESPONSE | ANYTHING | NO WAIT REQUIREMENTS |
| FIXED / NON VECTORED INTERRUPT | RESPONSE | Response₂ MUST WAIT FOR ALL BROADCAST MESSAGE RESPONSES TO BE RECEIVED. |
| FIXED / NON VECTORED INTERRUPT | ANYTHING BUT RESPONSE | NO WAIT REQUIREMENTS |
| LPA INTERRUPT | ANYTHING | NO WAIT REQUIREMENTS |
| SysMgt | ANYTHING | NO WAIT REQUIREMENTS |
| FENCE | POSTED REQUEST | Req₂ MUST WAIT FOR FENCE TO BE RETIRED. |
| FENCE | ANYTHING NONPOSTED | NO WAIT REQUIREMENTS |
| POSTED MEMORY WRITE | FENCE | Req₂ MAY BE RETIRED WHEN TgtDone₁. |
| POSTED I/O WRITE | FENCE | Req₂ MAY BE RETIRED WHEN TgtStart₁. |
| ANYTHING NONPOSTED | FENCE | NO WAIT REQUIREMENTS |

SYSTEM AND METHOD FOR IMPLEMENTING A SEPARATE VIRTUAL CHANNEL FOR POSTED REQUESTS IN A MULTIPROCESSOR COMPUTER SYSTEM

This application is a continuation-in-part of U.S. patent application Ser. No. 09/398,624, filed Sep. 17, 1999. This application is a continuation-in-part of U.S. patent application Ser. No. 09/399,281, filed Sep. 17, 1999.

FIELD OF THE INVENTION

This invention is related to the field of computer systems and, more particularly, to the routing of data between nodes in a multiprocessor computer system.

BACKGROUND OF THE INVENTION

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced.

On the other hand, distributed memory systems lack many of the above disadvantages. A computer system with a distributed memory system includes multiple nodes, two or more of which are coupled to different memories. The nodes are coupled to one another using any suitable interconnect. For example, each node may be coupled to each other node using dedicated lines. Alternatively, each node may connect to a fixed number of other nodes, and transactions may be routed from a first node to a second node to which the first node is not directly connected via one or more intermediate nodes. A memory address space of the computer system is assigned across the memories in each node.

In general, a "node" is a device which is capable of participating in transactions upon the interconnect. For example, the interconnect may be packet-based, and the node may be configured to receive and transmit packets as part of a transaction. Generally speaking, a transaction is a series of packets. A "requester" or "source" node initiates a transaction directed to a "target" node by issuing a request packet. Each packet, which is part of the transaction, is communicated between two nodes, with the receiving node being designated as the "destination" of the individual packet. When a packet ultimately reaches the target node, the target node accepts the information conveyed by the packet and processes the information internally. Alternatively, a node located on a communication path between the source and target nodes may relay the packet from the requester node to the target node.

In addition to the original request packet, the transaction may result in the issuance of other types of packets, such as responses, probes, and broadcasts, each of which is directed to a particular destination. For example, upon receipt of the original request packet, the target node may issue broadcast or probe packets to other nodes in the processing system. These nodes, in turn, may generate responses, which may be directed to either the target node or the requester node. If directed to the target node, the target node may respond by issuing a response back to the requester node.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed systems, nodes may initiate transactions concurrently and use the interconnect to transmit the transactions to other nodes. These transactions may have logical conflicts between them (e.g. coherency conflicts for transactions involving the same address) and may experience resource conflicts (e.g. buffer space may not be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

For example, certain deadlock conditions may occur in known I/O systems, such as the Peripheral Component Interconnect (PCI) I/O system, unless packets associated with a "posted" write transaction are allowed to pass other traffic not associated with a posted write transaction. Generally speaking, a posted write transaction is considered complete by the requester when the write request and corresponding data are transmitted by the requester (e.g., via a source interface), and thus, is effectively completed at the requester. Because the requester is not directly aware of when the posted write transaction is actually completed by the target, more ordering support for the posted operations must be provided in hardware. Thus, the requester may issue additional requests while the packet or packets of the posted write transaction travel to the target, with the assumption that such additional requests will complete after the initial posted transaction completes. Sufficient hardware must be available to support this assumption.

In contrast, a "non-posted" write transaction is not considered complete by the requester until the target (e.g., a target interface) has completed the non-posted write transaction. The target generally transmits an acknowledgement to the requester when the non-posted write transaction is completed. Such acknowledgements consume interconnect bandwidth and must be received and accounted for by the requester. Non-posted write transaction may be issued, for example, when the requester needs to know that previous transactions have been completed before following ones are issued.

In a computer system having a distributed memory system, memory requests (e.g., read and write operations) originating from I/O nodes may need to be properly ordered with respect to other pending memory operation to preserve memory coherency within the computer system and to satisfy any ordering requirements of the I/O system. For example, memory operations may need to be completed in the order in which they were generated to preserve memory coherency within the computer system and to satisfy I/O ordering requirements. It would thus be desirable to have a computer system implementing a system and method for providing a separate communication channel for posted requests. Such a system and method would avoid deadlock situations, while also minimizing the apparatus (in terms of hardware) to enhance ease of implementation.

SUMMARY OF THE INVENTION

A computer system is presented which implements a system and method for employing virtual channels and allocating different resources to the virtual channels. More particularly, the computer system provides a posted commands virtual channel separate from the non-posted commands virtual channel for routing requests through coherent and noncoherent fabrics within the computer system. Posted writes may belong to the posted commands virtual channel, and other requests may belong to the non-posted command virtual channel. Since virtual channels are provided separate resources within the computer system, posted writes may be allowed to become unordered with other requests from the same source. Advantageously, the computer system may maintain compatibility with previous I/O systems which require posted writes to become unordered with respect to previous non-posted requests (e.g. the Peripheral Component Interconnect Bus, or PCI), thus avoiding certain deadlocks that might otherwise occur in the I/O system. Advantageously, by providing a posted commands virtual channel, the computer system may provide the desired compatibility and may provide deadlock-free operation.

Broadly speaking, a method for routing packets among a plurality of nodes in a computer system is contemplated. A posted request packet is received in a first node of the plurality of nodes. The first node includes a plurality of packet buffers, each of which is assigned to a different one of a plurality of virtual channels. The posted request packet is stored in a posted command buffer, which is one of the plurality of packet buffers. The posted command buffer is dedicated to packets in a posted command virtual channel, which is one of the plurality of virtual channels.

Additionally, a computer system comprising a first node and a second node is contemplated. The first node is configured to transmit a posted request packet. Coupled to receive the posted request packet from the first node, the second node comprises a plurality of packet buffers including a posted command buffer. Each of the plurality of packet buffers is assigned to a different one of a plurality of virtual channels including a posted command virtual channel to which the posted command buffer is assigned. The second node is configured to store the posted request packet in the posted command buffer.

BRIEF DESCRIPTION OF THE DRAWINGS

Other objects and advantages of the invention will become apparent upon reading the following detailed description and upon reference to the accompanying drawings in which:

FIG. 3 is a diagram of an exemplary coherent information packet which may be employed within the processing subsystem;

FIG. 4 is a diagram of an exemplary coherent request packet which may be employed within the processing subsystem;

FIG. 5 is a diagram of an exemplary coherent response packet which may be employed within the processing subsystem;

FIG. 6 is a diagram of an exemplary coherent data packet which may be employed within the processing subsystem;

FIG. 7 is a table listing different types of coherent packets which may be employed within the processing subsystem;

FIG. 15 is a flowchart of the operation of an exemplary embodiment of a portion of the packet processing logic of FIG. 10 for processing request packets;

FIG. 20 is a table illustrating an exemplary embodiment of packet definitions for the noncoherent link;

FIG. 21 is a diagram of an exemplary non-coherent request packet which may be employed in the processing system;

FIG. 22 is a diagram of an exemplary non-coherent response packet which may be employed in the processing system;

FIG. 26 is a flowchart of the operation of an exemplary portion of the node logic of FIG. 24 for processing a response packet;

FIG. 27 is a flowchart of the operation of an exemplary portion of the node logic of FIG. 27 for initiating a packet; and FIG. 28 is a table listing exemplary ordering rules which may be implemented by the host bridge of FIG. 19.

Figure 1:
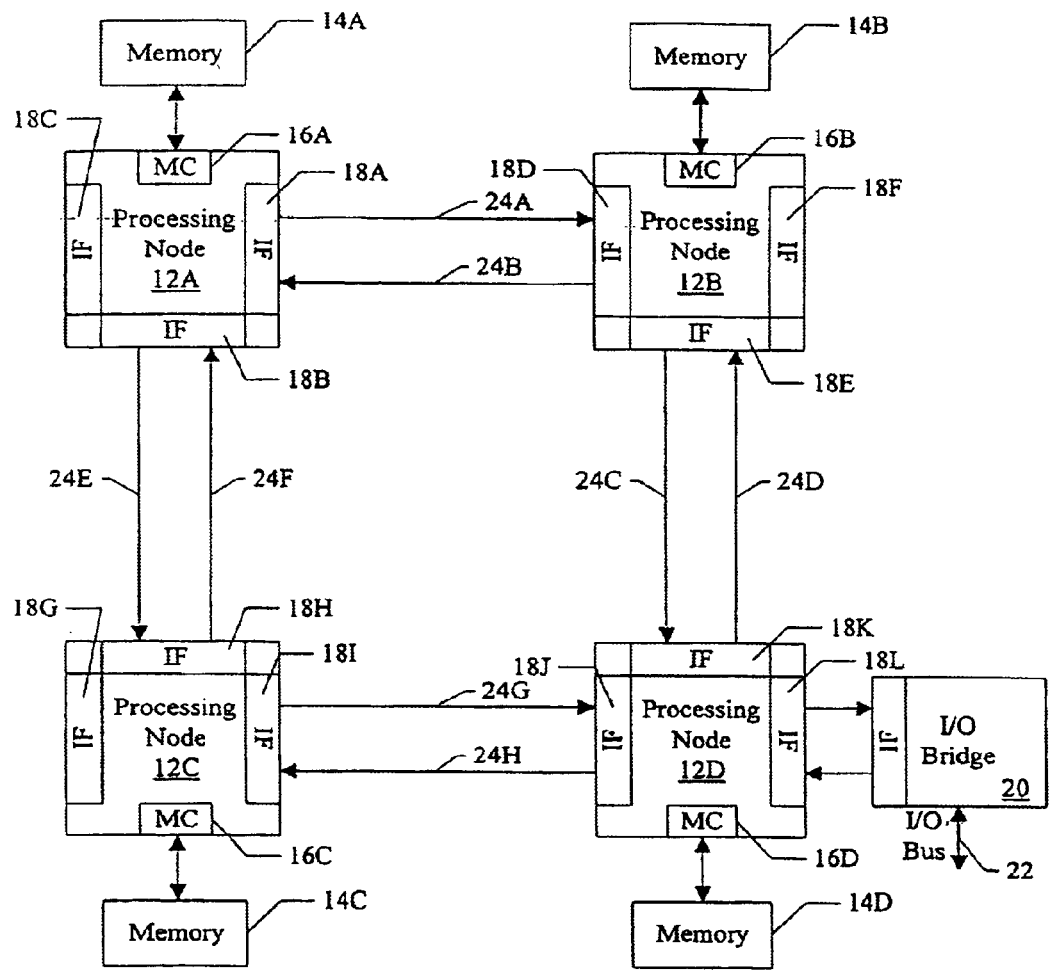
FIG. 1 is a block diagram of an exemplary embodiment of a computer processing system including a plurality of processing nodes.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

System Overview

Turning now to FIG. 1, one embodiment of a computer system 10 is shown. Other embodiments of computer system 10 are possible and contemplated. In the embodiment of FIG. 1, computer system 10 includes several processing nodes 12A, 12B, 12C, and 12D, although more or fewer processing nodes may be used. Each processing node is coupled to a respective memory 14A–14D via a memory controller 16A–16D included within each respective processing node 12A–12D. A memory address space of computer system 10 is assigned across memories 14A–14D such that system 10 has a distributed memory system. Additionally, processing nodes 12A–12D include interface logic used to communicate between the processing nodes 12A–12D. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an I/O bridge 20 via interface logic 18L. Other processing nodes may communicate with other I/O bridges in a similar fashion. I/O bridge 20 is coupled to an I/O bus 22.

Processing nodes 12A–12D implement a packet-based bi-directional link 24 for inter-processing node communication. In the present embodiment, the bi-directional link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache-coherent fashion for communication between processing nodes ("the coherent link") or in a noncoherent fashion for communication between a processing node and an I/O bridge (the "noncoherent link"). Furthermore, the noncoherent link may be implemented as a daisy-chain structure between I/O devices to replace I/O bus 22. The interconnection of two or more nodes via coherent links may be referred to as a "coherent fabric". Similarly, the interconnection of two or more nodes via noncoherent links may be referred to as a "noncoherent fabric". It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used.

Memories 14A–14D may comprise any suitable memory devices. For example, a memory 14A–14D may comprise one or more RAMBUS DRAMs (RDRAMs), synchronous DRAMs (SDRAMs), static RAM, etc. As mentioned, the address space of computer system 10 is assigned across memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the particular memory controller 16A–16D coupled to the memory storing bytes corresponding to the address. In other words, the memory controller 16A–16D is responsible for ensuring that each memory access to the corresponding memory 14A–14D occurs in a cache-coherent fashion. Memory controllers 16A–16D may comprise control circuitry for interfacing to memories 14A–14D. Additionally, memory controllers 16A–16D may include request queues for queuing memory requests.

Generally, interface logic 18A–18L may comprise buffers for receiving packets from the bi-directional link and for buffering packets to be transmitted upon the link. Computer system 10 may employ any suitable flow control mechanism for transmitting packets. For example, interface logic within each node may store a count of the number of each type of buffer within the interface logic of a receiving node at the other end of the communication link. A transmitting node may not transmit a packet unless the receiving node has a free buffer of the correct type for storing the packet. As each buffer is freed within the receiving node (e.g., by routing a stored packet), the receiving node transmits a message to the transmitting node indicating that the buffer has been freed. Such a mechanism may be referred to as a "coupon-based" system.

Figures 2, 18:
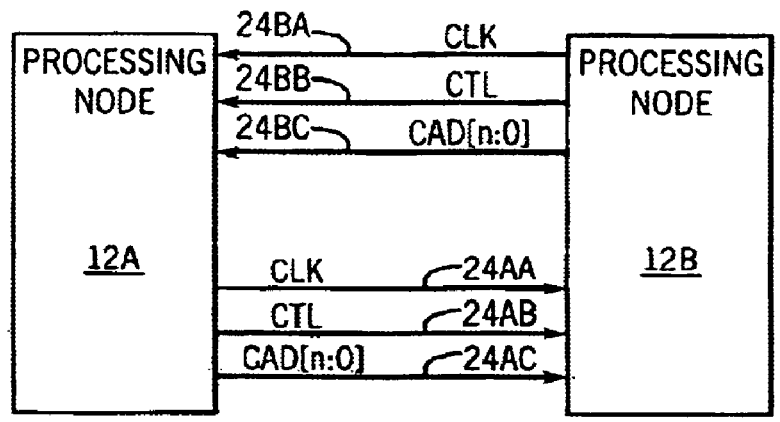
FIG. 2 is a block diagram of two of the processing nodes of FIG. 1, showing an exemplary embodiment of the communication link interconnecting the nodes.
FIG. 18 is a block diagram illustrating an exemplary embodiment of an info packet including buffer release fields.

Turning next to FIG. 2, a block diagram illustrating processing nodes 12A and 12B is shown to illustrate an exemplary embodiment of the bi-directional link 24 therebetween. Other embodiments of communication link 24 are possible and contemplated. In the embodiment of FIG. 2, bi-directional link 24 comprises unidirectional lines 24A and unidirectional lines 24B. Lines 24A include a clock signal line (CLK) 24AA, a control signal line (CTL) 24AB, and a command/address/data bus (CAD) 24AC. Similarly, lines 24B include a clock signal line 24BA, a control signal line 24BB, and a command/address/data bus 24BC.

The clock line transmits a clock signal which indicates a sample point for the control line and the command/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the command/address/ data bus. For example, four clock lines may be used for a 32 bit command/address/data bus.

The control line indicates whether or not the data transmitted upon the command/address/data bus is either a bit time of control information or a bit time of data. The control line is asserted to indicate a bit time of control information, and deasserted to indicate a bit time of data. Certain control information indicates that data follows. The data may immediately follow the corresponding control information. In one embodiment, other control information may interrupt the transmission of data. Such an interruption may be performed by asserting the control line for a number of bit times during transmission of the data and transmitting the bit times of the control information while the control line is asserted. Control information which interrupts data may not indicate that data will be following. Additionally, in one embodiment, the control line may be deasserted during transmission of control information to indicate stall bit times. A subsequent reassertion of the control line may indicate that the control information is continuing.

The command/address/data bus comprises a set of lines for transmitting the data/control bits. In one embodiment, the command/address/data bus may comprise 8, 16, or 32 lines. Each processing node or I/O bridge may employ any one of the supported numbers of lines according to design choice. Other embodiments may support other sizes of command/address/data bus as desired.

According to one embodiment, differential signaling may be employed in the command/address/data bus lines and the clock lines. Alternatively, the lines may carry either active low data (i.e. a logical "1" is represented as a low voltage on the line, and a logical "0" is represented as a high voltage) or active high data (in which a logical "1" is represented as a high voltage on the line, and logical "0" is represented as a low voltage).

A packet transmitted within computer system 10 may pass through one or more intermediate processing nodes. For example, a packet transmitted by processing node 12A to processing node 12D within system 10 may pass through either processing node 12B or processing node 12C. (See FIG. 1.) If processing node 12A transmits the coherent packet to processing node 12B, processing node 12B may receive the packet, then forward the packet to processing node 12D. On the other hand, if processing node 12A transmits the coherent packet to processing node 12C, processing node 12C may receive the packet, then forward the packet to processing node 12D. Any suitable packet routing algorithm may be used within system 10. Other embodiments of computer system 10 may include more or fewer processing nodes 12 than the embodiment of FIG. 1.

The coherent packets used within system 10 may have different formats, and may include different data. FIGS. 3–6 illustrate exemplary coherent packet formats which may be employed within processing subsystem 12. FIGS. 3–5 illustrate exemplary coherent information, request, and response packets, respectively, and FIG. 6 illustrates an exemplary coherent data packet. Information (info) packets carry information related with the general operation of the communication link, such as flow control information, error status, etc. Request, and response packets carry control information regarding a transaction. Some request and response packets specify that a data packet follows. The data packet carries data associated with the transaction and the corresponding request or response packet. Other embodiments may employ different packet formats.

The exemplary packet formats of FIGS. 3–6 show the contents of bits 7-0 of eight-bit bytes transmitted in parallel during consecutive "bit times". The amount of time used to transmit each data unit of a packet (e.g., byte) is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal. Bit times for which no value is provided in the figures may either be reserved for a given packet, or may be used to transmit packet-specific information. Fields indicated by dotted lines indicate optional fields which may not be included in all of the packets of a certain type.

FIG. 3 is a diagram of an exemplary coherent information (info) packet 30 which may be employed within processing subsystem 12. Info packet 30 includes four bit times on an eight-bit coherent communication link. A six-bit command field Cmd[5:0] is transmitted during the first bit time (i. e., bit time 0). The request and response packets of FIGS. 4 and 5 include a similar command encoding in the same bit positions during bit time 0. Info packet 30 may be used to transmit messages between nearest neighbor processing nodes when the messages do not include an address. Information packets are not routed within the fabric, and hence, may not require any buffering in the receiver nodes. Additionally, information packets may be used to transmit messages indicating the freeing of buffers in the coupon-based flow scheme described above. Other types of information packets include a system synchronization (Sync) packet and a no-operation (NOP) packet, as illustrated in FIG. 7. In one embodiment, the messaging protocol may require that information packets are not flow controlled and should always be accepted at their destination nodes.

FIG. 4 is a diagram of an exemplary coherent request packet 32, which may be employed within processing subsystem 12. Request packet 32 comprises eight bit times on an eight-bit coherent communication link. Request packet 32 may be used to initiate a transaction (e.g., a read or write transaction), as well as to transmit requests in the process of carrying out the transaction for those requests which carry the address affected by the transaction. Generally, a request packet indicates an operation to be performed by the destination node.

The bits of a command field Cmd[5:0] identifying the type of request are transmitted during bit time 0. Bits of a source unit field SrcUnit[1:0] containing a value identifying a source unit within the source node are also transmitted during bit time 0. Types of units within computer system 10 may include memory controllers, caches, processors, etc. Bits of a source node field SrcNode[2:0] containing a value identifying the node which initiated the transaction are transmitted during bit time 1. Bits of a destination node field DestNode[2:0] containing a value which uniquely identifies the destination node may also be transmitted during bit time 1, and may be used to route the packet to the destination node. Bits of a destination unit field DestUnit[1:0] containing a value identifying the destination unit within the destination node which is to receive the packet may also be transmitted during bit time 1.

Many request packets may also include bits of a source tag field SrcTag[4:0] in bit time 2 which, together with the source node field SrcNode[2:0] and the source unit field SrcUnit[1:0], may uniquely link the packet to a particular transaction of which it is a part. Bit time 3 may be used in some requests to transmit the least significant bits of the memory address affected by the transaction. Bit times 4–7 are used to transmit the bits of an address field Addr[39:8] containing the most significant bits of the address affected by the transaction. Some of the undefined fields in packet 32 may be used in various request packets to carry command-specific information.

FIG. 5 is a diagram of an exemplary coherent response packet 34 which may be employed within processing subsystem 12. Response packet 34 includes the command field Cmd[5:0], the destination node field DestNode[2:0], and the destination unit field DestUnit[1:0]. The destination node field DestNode[2:0] identifies the destination node for the response packet (which may, in some cases, be the source node or target node of the transaction). The destination unit field DestUnit[1:0] identifies the destination unit within the destination node. Various types of response packets may include additional information. For example, a read response packet may indicate the amount of read data provided in a following data packet. Probe responses may indicate whether or not a copy of the requested cache block is being retained by the probed node (using the optional shared bit "Sh" in bit time 3).

Generally, response packet 34 is used for responses during the carrying out of a transaction which do not require transmission of the address affected by the transaction. Furthermore, response packet 34 may be used to transmit positive acknowledgement packets to terminate a transaction. Similar to the request packet 32, response packet 34 may include the source node field SrcNode[2:0], the source unit field SrcUnit[1:0], and the source tag field SrcTag[4:0] for many types of responses (illustrated as optional fields in FIG. 5).

FIG. 6 is a diagram of an exemplary coherent data packet 36, which may be employed within processing subsystem 12. Data packet 36 of FIG. 6 includes eight bit times on an eight-bit coherent communication link. Data packet 36 may comprise different numbers of bit times dependent upon the amount of data being transferred. For example, in one embodiment a cache block comprises 64 bytes and hence 64 bit times on an eight-bit link. Other embodiments may define a cache block to be of a different size, as desired. Additionally, data may be transmitted in less than cache block sizes for non-cacheable reads and writes. Data packets for transmitting data less than cache block size employ fewer bit times. In one embodiment, non-cache block sized data packets may transmit several bit times of mask bits prior to transmitting the data to indicate which data bytes are valid within the data packet. Furthermore, cache block data may be returned as an eight-byte quadword addressed by the least significant bits of the request address first, followed by interleaved return of the remaining quadwords.

FIGS. 3–6 illustrate packets for eight-bit coherent communication links. Packets for 16 and 32-bit links may be formed by concatenating consecutive bit times of FIGS. 3–6. For example, bit time 0 of a packet on a 16-bit link may comprise the information transmitted during bit times 0 and 1 on the eight-bit link. Similarly, bit time 0 of the packet on a 32-bit link may comprise the information transmitted during bit times 0–3 on the eight-bit link.

Formulas 1 and 2 below illustrate the formation of bit time 0 of a 16-bit link and bit time one of a 32-bit link according to bit times from an eight bit link.

$$BT0_{16}[15:0]=BT1_8[7:0]\|BT2_8[7:0] \quad (1)$$

$$BT0_{32}[31:0]=BT3_8[7:0]\|BT2_8[7:0]\|BT1_8[7:0]\|BT0_8[7:0] \quad (2)$$

FIG. 7 is a table 38 listing different types of coherent packets which may be employed within processing subsystem 12. Other embodiments of processing subsystem 12 are possible and contemplated, and may include other suitable sets of packet types and command field encodings. Table 38 includes a command code column including the contents of command field Cmd[5:0] for each coherent command, a command column including a mnemonic representing the command, and a packet type column indicating which of coherent packets 30, 32, and 34 (and data packet 36, where specified) is employed for that command. A brief functional description of some of the commands in table 38 are provided below.

A read transaction may be initiated using a sized read (Read(Sized)) request, a read block (RdBlk) request, a read block shared (RdBlkS) request, or a read block with modify (RdBlkMod) request. The Read(Sized) request is used for non-cacheable reads or reads of data other than a cache block in size. The amount of data to be read is encoded into the Read(Sized) request packet. For reads of a cache block, the RdBlk request may be used unless: (i) a writeable copy of the cache block is desired, in which case the RdBlkMod request may be used; or (ii) a copy of the cache block is desired but no intention to modify the block is known, in which case the RdBlkS request may be used. The RdBlkS request may be used to make certain types of coherency schemes (e.g., directory-based coherency schemes) more efficient.

In general, to initiate the transaction, the appropriate read request is transmitted from the source node to a target node which owns the memory corresponding to the cache block. The memory controller in the target node transmits Probe requests to the other nodes in the system to maintain coherency by changing the state of the cache block in those nodes and by causing a node including an updated copy of the cache block to send the cache block to the source node. Each node receiving a Probe request transmits a probe response (ProbeResp) packet to the source node.

If a probed node has a modified copy of the read data (i.e., dirty data), that node transmits a read response (RdResponse) packet and the dirty data to the source node. A node transmitting dirty data may also transmit a memory cancel (MemCancel) response packet to the target node in an attempt to cancel transmission by the target node of the requested read data. Additionally, the memory controller in the target node transmits the requested read data using a RdResponse response packet followed by the data in a data packet.

If the source node receives a RdResponse response packet from a probed node, the received read data is used. Otherwise, the data from the target node is used. Once each of the probe responses and the read data is received in the source node, the source node transmits a source done (SrcDone) response packet to the target node as a positive acknowledgement of the termination of the transaction.

A write transaction may be initiated using a sized write (Wr(Sized)) request packet or a victim block (VicBlk) request packet followed by a corresponding data packet. The Wr(Sized) request is used for non-cacheable writes or writes of data other than a cache block in size. To maintain coherency for Wr(Sized) requests, the memory controller in the target node transmits Probe requests to each of the other nodes in the system. In response to the Probe requests, each probed node transmits a ProbeResp response packet to the target node. If a probed node is storing dirty data, the probed node responds with a RdResponse response packet and the dirty data. In this manner, a cache block updated by the Wr(Sized) request is returned to the memory controller for merging with the data provided by the Wr(Sized) request. The memory controller, upon receiving probe responses from each of the probed nodes, transmits a target done (TgtDone) response packet to the source node to provide a positive acknowledgement of the termination of the transaction. The source node replies with a SrcDone response packet.

A victim cache block which has been modified by a node and is being replaced in a cache within the node is transmitted back to memory using a VicBlk request packet. Probes are not needed for the VicBlk request. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk request and receipt of the TgtDone response packet (e.g. in response to an intervening probe).

A change to dirty (ChangetoDirty) request packet may be transmitted by a source node in order to obtain write permission for a cache block stored by the source node in a non-writeable state. A transaction initiated with a ChangetoDirty request may operate similar to a read transaction except that the target node does not return data. A validate block (ValidateBlk) request may be used to obtain write permission to a cache block not stored by a source node if the source node intends to update the entire cache block. No data is transferred to the source node for such a transaction, but otherwise operates similar to a read transaction.

A target start (TgtStart) response may be used by a target to indicate that a transaction has been started (e.g. for ordering of subsequent transactions). A no operation (NOP) info packet may be used to transfer flow control information between nodes (e.g., buffer free indications). A Broadcast request packet may be used to broadcast messages between nodes (e.g., to distribute interrupts). Finally, a synchronization (Sync) info packet may be used to synchronize node operations (e.g. error detection, reset, initialization, etc.).

Table 38 also includes a virtual channel (Vchan) column. The Vchan column indicates the virtual channel in which each packet travels (i.e., to which each packet belongs). In the present embodiment, four virtual channels are defined: a non-posted command (NPC) virtual channel, a posted command (PC) virtual channel, a response (R) virtual channel, and a probe (P) virtual channel.

Virtual Channels

Figure 8:
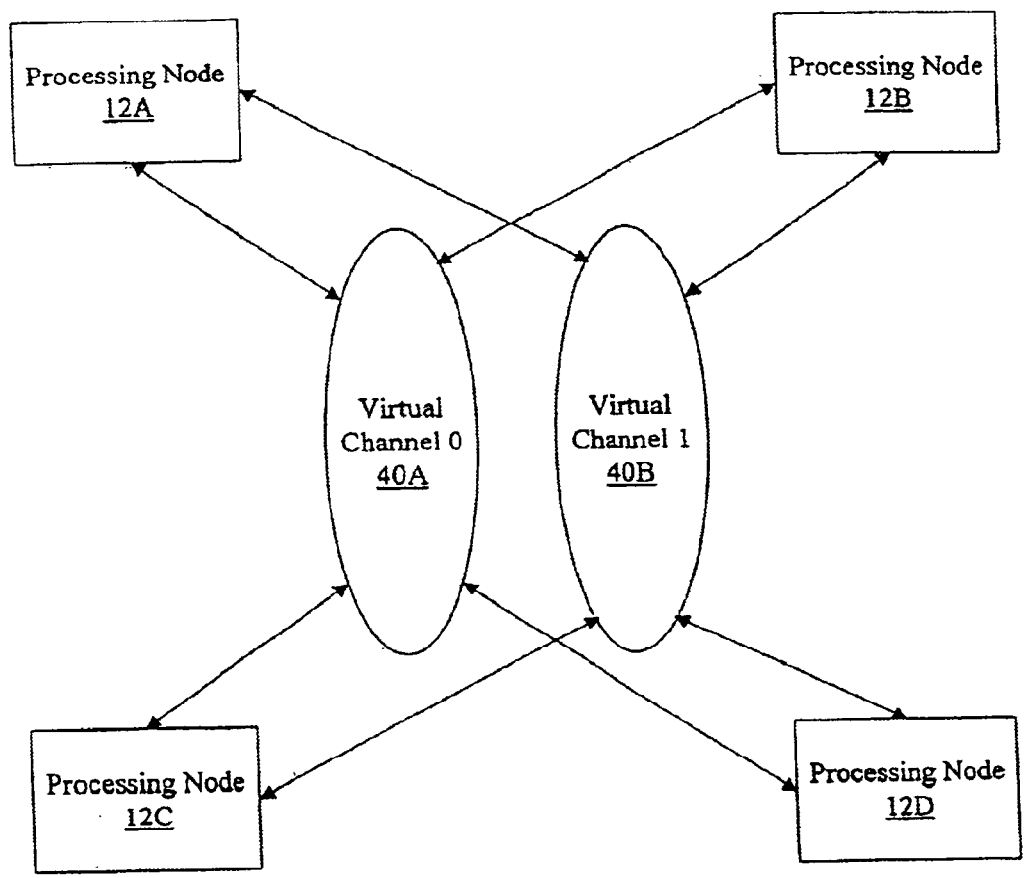
FIG. 8 is a block diagram illustrating a pair of virtual channels in the processing system.

Turning next to FIG. 8, two virtual channels 40A and 40B and their relationship to processing nodes 12A–12D are diagrammatically illustrated. Although only two virtual channels are shown, it should be understood that other embodiments of computer system 10 may employ any suitable number of virtual channels.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (e.g., by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links (e.g. lines 24 in FIG. 1). However, since a receiving buffer is available prior to transmission, the virtual channels do not block each other even while using this shared resource.

Each different packet type (e.g. each different command field CMD[5:0]) could be assigned to its own virtual channel. However, the hardware to ensure that virtual channels are physically conflict-free may increase with the number of virtual channels. For example, in one embodiment, separate buffers are allocated to each virtual channel. Since separate buffers are used for each virtual channel, packets from one virtual channel do not physically conflict with packets from another virtual channel (since such packets would be placed in the other buffers). It is noted, however, that the number of buffers is proportional to the number of virtual channels. Accordingly, it is desirable to reduce the number of virtual channels by combining various packet types which do not conflict in a logical/protocol fashion. While such packets may physically conflict with each other when travelling in the same virtual channel, their lack of logical conflict allows for the resource conflict to be resolved without deadlock. Similarly, keeping packets which may logically conflict with each other in separate virtual channels provides for no resource conflict between the packets. Accordingly, the logical conflict may be resolved through the lack of resource conflict between the packets by allowing the packet which is to be completed first to make progress.

In one embodiment, packets travelling within a particular virtual channel on the coherent link from a particular source node to a particular destination node remain in order. However, packets from the particular source node to the particular destination node which travel in different virtual channels are not ordered. Similarly, packets from the particular source node to different destination nodes, or from different source nodes to the same destination node, are not ordered (even if travelling in the same virtual channel).

Figure 19:
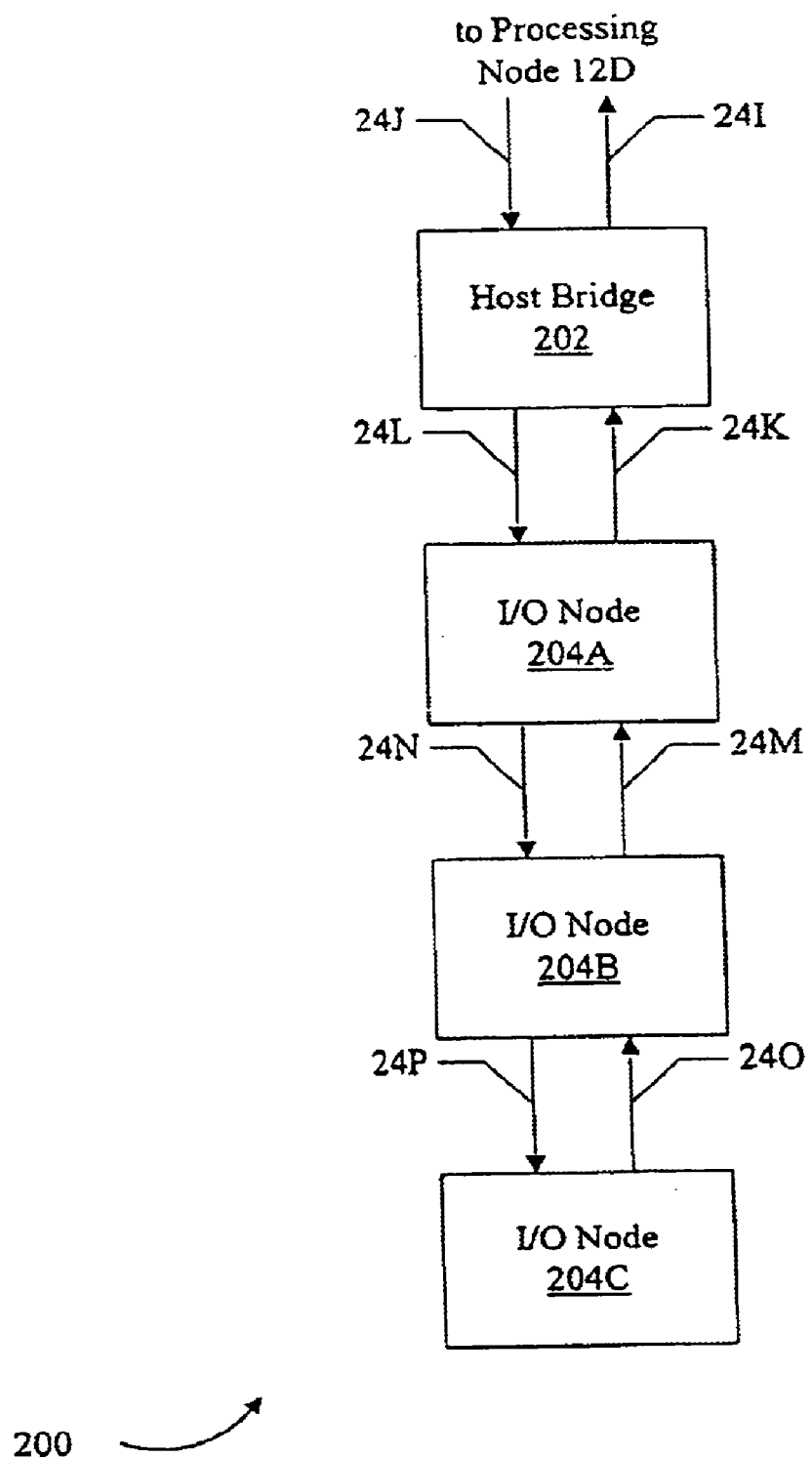
FIG. 19 is a block diagram of an exemplary embodiment of an I/O subsystem including a host bridge and a plurality of I/O nodes interconnected via links similar to the interconnection shown in FIGS. 1 and 2.

The virtual channels are physically mapped onto the coherent fabric and onto the noncoherent fabric (see FIG. 19). For example, in the embodiment of computer system 10 shown in FIG. 1, the interconnect includes unidirectional links between each processing node. Accordingly, packets travelling in the various virtual channels are physically transmitted on the unidirectional links. Packets may travel through intermediate nodes between the source and the destination. For example, packets travelling from node 12A to node 12D may pass through node 12B or 12C. Packets travelling in different virtual channels may be routed through computer system 10 differently. For example, packets travelling in a first virtual channel from node 12A to node 12D may pass through node 12B, while packets travelling in a second virtual channel from node 12A to node 12D may pass through node 12C. Each node may include circuitry to ensure that packets in different virtual channels do not physically conflict with each other. In the noncoherent fabric, packets from an I/O node may pass through each other I/O node between that I/O node and the host bridge (see FIG. 19). It is noted that the I/O nodes may be coupled to the virtual channels in a similar fashion to that shown in FIG. 8.

In one particular embodiment described in more detail below, command packet buffers are assigned to each virtual channel to buffer packets travelling in that virtual channel. Separate data packet buffers may also be assigned to each virtual channel which may carry data packets. By separating command packet buffers (each entry of which may comprise a relatively small number of bit times) and data packet buffers (each entry of which may comprise a relatively large number of bit times to hold a cache block), buffer space may be saved while still providing suitable data storage. More command packet buffers may be implemented than data packet buffers (since all data packets have a corresponding request or response packet but not all request or response packets have a corresponding data packet). Throughput may be high while making relatively efficient use of the buffer space.

Figure 9:
FIG. 9 is a table illustrating an exemplary embodiment of a set of virtual channels and their applicable links.

FIG. 9 is a table 42 illustrating the virtual channels defined according to one embodiment of computer system 10. Other embodiments are possible and contemplated. For the embodiment shown, four virtual channels are defined. The packets which belong to those virtual channels for the coherent link are shown in FIG. 7, and the packets which belong to those virtual channels for the noncoherent link are shown in FIG. 20.

A given request may be a "posted" or a "non-posted" request. Generally speaking, a posted request is considered complete by the source node when the request and the corresponding data are transmitted by the source node (e.g., by an interface within the source node). A posted request is thus effectively completed at the source. As a result, the source node may issue other requests and continue with other operations while the packet or packets of the posted request travel to the target node and the target node completes the posted request. The source node is not directly aware of when the posted request is actually completed by the target mode. In an exemplary embodiment, coherent posted request packets include a posted bit in the command field which is used as a virtual channel identifier. A coherent posted request is completed in the coherent fabric by transmitting the TgtDone response to the source node prior to completing the posted request on the target interface (e.g. the noncoherent link).

A non-posted request, in contrast to a posted request, is a request which is not completed on the source interface prior to completing on the target interface. In this manner, the source of the request is directly aware (via completion of the request) that the request has completed at the target. Generally, the various non-posted request packets do not have a logical/protocol conflict with each other since three is no order between them until they reach the destination (i.e., the target of the transaction). Accordingly, non-posted request packets may be included in one virtual channel.

In the exemplary embodiment, posted and non-posted request packets belong to separate virtual channels to provide compatibility with certain input/output (or peripheral) bus protocols. For example, the Peripheral Component Interconnect (PCI) bus interface provides for posted writes. The following ordering rules are required by PCI for operations sourced on PCI:

(i) posted writes from the same source remain in order on the target interface;

(ii) posted writes followed by a read from the same source are completed on the target interface before the read data is returned;

(iii) non-posted writes may not pass posted writes from the same source; and (iv) posted writes must be allowed to pass prior non-posted requests.

Requirement (i) is accomplished by placing posted requests in the posted command virtual channel (and thus they remain ordered to a particular target) along with certain constraints implemented by the host bridge (see FIG. 28). Requirements (i) and (iii) are logical conflicts between the posted requests channel and the non-posted commands channel on the noncoherent fabric. Additional details regarding the logical conflict on the noncoherent link will be provided below. Requirements (ii) and (iii) may be satisfied when posted writes are transmitted from the noncoherent link to the coherent link by implementing certain constraints at the host bridge (see FIG. 28). Requirement (iv) is satisfied by providing separate posted command, non-posted command, and response virtual channels.

Posted and non-posted requests may cause the generation of probe request packets (to maintain coherency in the coherent fabric) and response packets (to transfer data and provide positive acknowledgement of transactions). Accordingly, probe packets and response packets are not included in the same virtual channel as the posted and non-posted requests (to prevent resource conflicts and logical conflicts from creating a deadlock). Furthermore, probe packets may cause the generation of probe response and read response packets, and thus are placed in a separate virtual channel from response packets.

Response packets may also generate additional response packets (for example, SrcDone and TgtDone may cause each other to be generated). Therefore, response packets may logically conflict with other response packets if all response packets are assigned to the same virtual channel. However, assigning response packets to multiple different virtual channels may be undesirable due to the increased resource requirements (e.g. buffers) to handle the additional virtual channels. It is noted that response packets are the result, either directly or indirectly (e.g. via a probe generated in response to a request packet), of a request packet (either posted or non-posted). Thus, in an exemplary embodiment, nodes 12A–12D (and I/O nodes shown below) may be configured to allocate, prior to initiating a transaction with a posted or non-posted request packet, sufficient resources for processing the response packets (including any response data packets) which may be generated in response to any transmitted during that transaction. Similarly, prior to generating a probe request packet, a node may be configured to allocate sufficient resources for processing the probe response packets (if the response packets will be returned to that node). Due to this pre-allocation of resources, logical conflicts are avoided and all response packets can be received by the processing node. Accordingly, the response packets may be merged into one response virtual channel in which all response packets (and corresponding data packets) may travel.

Probe request packets travel in the probe virtual channel. Probes are used to maintain coherency between various cached copies of a memory location and the memory location itself. Coherency activities corresponding to a first request packet being processed by a memory controller may need to be completed before subsequent request packets may be processed. For example, if the memory controller's queue were full of requests associated with the same cache block, no additional processing of request packets could occur at the memory controller until completion of the first request. Accordingly, the probe request packets may be assigned to a separate virtual channel to ensure that resource conflicts with packets in other virtual channels do not block the probe request packets.

Table 42 also indicates the type of communication link (e.g., coherent or non-coherent) which supports each type of virtual channel. For example, non-coherent and coherent links both support the posted command, non-posted command, and response virtual channels. However, because probe request packets are intended to ensure coherency and non-coherent links do not support coherency, a non-coherent link may not be used as a probe virtual channel.

Virtual Channels—Coherent Fabric

Figure 10:
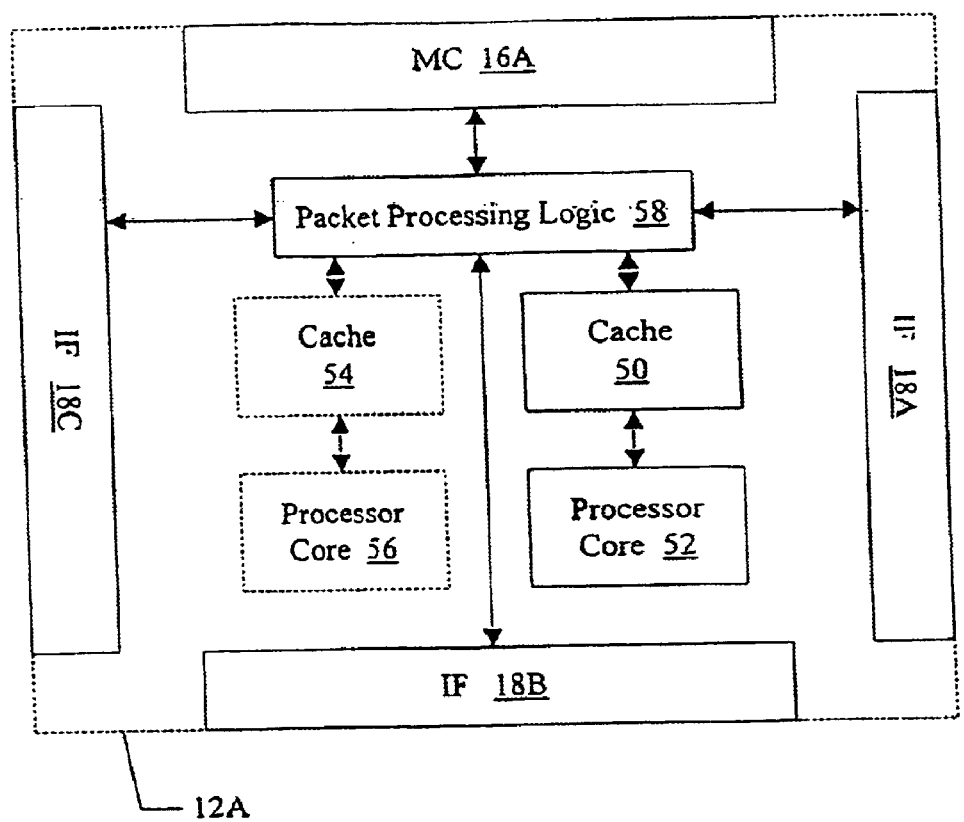
FIG. 10 is a block diagram of an exemplary embodiment of a processing node of FIG. 1, the node including packet processing logic.

Turning now to FIG. 10, a block diagram of one embodiment of an exemplary processing node 12A is shown. Other processing nodes 12B–12D may be configured similarly. Further, other embodiments of processing nodes 12A–12D are possible and contemplated. In the embodiment of FIG. 10, processing node 12A includes interface logic 18A, 18B, and 18C and memory controller 16A. Additionally, processing node 12A includes a processor core 52 and a cache 50, packet processing logic 58, and may optionally include a second processor core 56 and a second cache 54. Interface logic 18A–18C are coupled to packet processing logic 58. Processor cores 52 and 56 are coupled to caches 50 and 54, respectively. Caches 50 and 54 are coupled to packet processing logic 58. Packet processing logic 58 is coupled to memory controller 16A.

Generally, packet processing logic 58 is configured to respond to request packets received on the links to which processing node 12A is coupled, to generate request packets in response to requests from caches 50 and 54 and/or processor cores 52 and 56, to generate probe requests and response packets in response to transactions selected by memory controller 16A for service, and to route packets for which node 12A is an intermediate node to another of interface logic 18A–18C for transmission to another node. Interface logic 18A, 18B, and 18C may include logic to receive packets and synchronize the packets to the internal clock used by packet processing logic 58.

Figure 11:
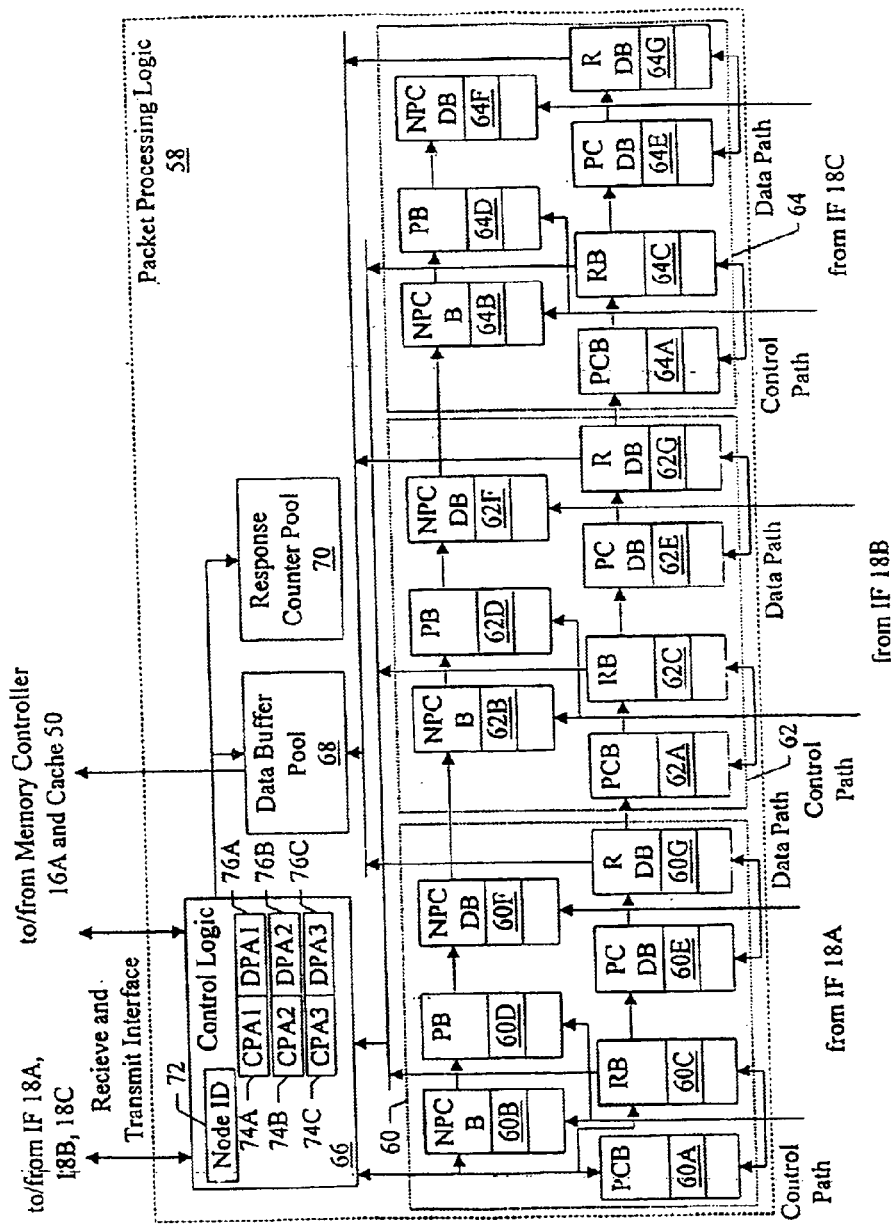
FIG. 11 is a block diagram of an exemplary embodiment of the packet processing logic of the node of FIG. 10, the packet processing logic including a data buffer pool and a response counter pool.

Packet processing logic 58 may include the hardware to support resource independence of the virtual channels supported by computer system 10. For example, packet processing logic 58 may provide separate buffers for each virtual channel as illustrated in FIG. 11. Alternative embodiments may provide the hardware for providing resource independence of the virtual channels within interface logic 18A–18C, or any other suitable location.

Caches 50 and 54 comprise high speed cache memories configured to store cache blocks of data. Caches 50 and 54 may be integrated within respective processor cores 52 and 56. Alternatively, caches 50 and 54 may be coupled to processor cores 52 and 56 in a backside cache configuration or an in-line configuration, as desired. Still further, caches 50 and 54 may be implemented as a hierarchy of caches. Caches which are nearer to processor cores 52 and 56 (within the cache hierarchy) may be integrated into processor cores 52 and 56, if desired.

Processor cores 52 and 56 include the circuitry for executing instructions according to a predefined instruction set. For example, the x86 instruction set architecture may be selected. Alternatively, the Alpha, PowerPC, or any other instruction set architecture may be selected. Generally, the processor cores access the caches for data and instructions. If a cache miss is detected, a read request is generated and transmitted to the memory controller within the node to which the missing cache block is mapped.

Turning now to FIG. 11, a block diagram of an exemplary embodiment of packet processing logic 58 is shown. Other embodiments are possible and contemplated. In the embodiment of FIG. 11, packet processing logic 58 includes a first set of command and data packet buffers 60, a second set of command and data packet buffers 62, a third set of command and data packet buffers 64, control logic 66, a data buffer pool 68, and a response counter pool 70. Command and data packet buffers 60 include a posted command buffer (PCB) 60A, a non-posted command buffer (NPCB) 60B, a response buffer (RB) 60C, a probe buffer (PB) 60D, a posted command data buffer (PCDB) 60E, a non-posted command data buffer (NPCDB) 60F and a response data buffer (RDB) 60G.

Similarly, command and data packet buffers 62 include a posted command buffer (PCB) 62A, a non-posted command buffer (NPCB) 62B, a response buffer (RB) 62C, a probe buffer (PB) 62D, a posted command data buffer (PCDB) 62E, a non-posted command data buffer (NPCDB) 62F and a response data buffer (RDB) 62G. Command and data packet buffers 64 include a posted command buffer (PCB) 64A, a non-posted command buffer (NPCB) 64B, a response buffer (RB) 64C, a probe buffer (PB) 64D, a posted command data buffer (PCDB) 64E, a non-posted command data buffer (NPCDB) 64F and a response data buffer (RDB) 64G. Command and data packet buffers 60 are coupled to receive packets received by interface logic 18A (e.g. on lines 24B). Similarly, command and data packet buffers 62 are coupled to receive packets received by interface logic 18B, and command and data packet buffers 64 are coupled to receive packets received by interface logic 18C. Command and data packet buffers 60, 62, and 64 are coupled to control logic 66.

Additionally, response data buffers 60G, 62G, and 64G are coupled to data buffer pool 68. Data buffer pool 68 and response counter pool 70 are coupled to control logic 66, which further includes a node ID register 72, command packet active registers 74A–74C, and data packet active register 76A–76C. Control logic 66 is coupled to interfaces 18A–18C via a receive and transmit interface, and is coupled to memory controller 16A and cache 50 (and optional cache 54) as well. Data buffer pool 68 is further coupled to memory controller 16A and cache 50 (and optional cache 54).

Each set of command and data packet buffers provides different buffers for each of the virtual channels. For example, in the present embodiment, posted command buffer 60A may be assigned to the posted command virtual channel, non-posted command buffer 60B may be assigned to the non-posted command virtual channel, response buffer 60C may be assigned to the response virtual channel, and probe buffer 60D may be assigned to the probe virtual channel. In this manner, receipt of packets in one virtual channel may not be impeded by receipt of packets in another virtual channel. Packets from each virtual channel may be stored in the command packet buffer corresponding to that virtual channel, and hence will not physically conflict with packets received from another virtual channel (which are stored in a different command packet buffer). Similarly named buffers within buffers 62 and 64 may be assigned to the virtual channels as described above.

Similarly, data packet buffers are provided for each virtual channel which carries data packets. In an exemplary embodiment, the probe virtual channel may not carry data packets. For example, posted command data buffer 60E may be assigned to the posted command virtual channel, non-posted command data buffer 60F may be assigned to the non-posted command virtual channel, and response data buffer 60G may be assigned to the response virtual channel. Similarly named buffers within buffers 62 and 64 may be assigned to the virtual channels as described above.

In the present embodiment, interface logic 18A–18C is configured to divide received packets into packets provided on the control path and data packets provided on the data path. The control path is coupled to the command packet buffers (e.g. buffers 60A–60D are coupled to the control path from interface logic 18A), and the data path is coupled to the data packet buffers (e.g. buffers 60E–60G are coupled to the data path from interface logic 18A). Control logic 66 may be configured to receive an indication of the type of the packet via the receive and transmit interface, and further may be configured to allocate a buffer entry for the packet being received. In other contemplated embodiments, the received packets are not divided by the interface logic. In such embodiments, control logic 66 may receive the control (CTL) signal to distinguish bit times of data from bit times of control information.

Generally, control logic 66 may be configured to process packets from the various buffers independently of the packets held in the other buffers. Accordingly, physical conflicts between packets travelling in different virtual channels can be avoided.

In an exemplary embodiment, control logic 66 examines packets within command packet buffers 60, 62, and 64 to determine if the packets are destined for node 12A ("this node") or are to be forwarded to another node. Node ID register 72 stores the node ID of "this node", and control logic 66 may perform a comparison with reference to the Node ID to determine whether the packets are destined for "this node". It is noted that, in the present embodiment, packets in the probe virtual channel are broadcast packets and hence are destined for both "this node" and other nodes to which "this node" is to transmit the packet. Hence, control logic 66 may omit the node ID comparison for packets received on the probe virtual channel. However, packets in virtual channels other than the probe virtual channel are directed packets for which the packet's destination node field identifies whether the packet is destined for this node or is to be forwarded to another node. Accordingly, control logic 66 may perform the node ID comparison for such packets.

Control logic 66 may include one or more routing tables which indicate, for each destination node, which of the interface logic 18A–18C may be used to forward broadcast packets or packets destined for other nodes. Control logic 66 may forward the packet when the receiving node coupled to receive packets transmitted via the identified interface logic 18A–18C has a free command packet buffer for the virtual channel to which that packet is assigned. Additionally, if the packet specifies a data packet, the control logic 66 confirms availability of a data packet buffer for the virtual channel to which the packet is assigned before the control logic 66 forwards the packet and the specified data packet. If the control logic 66 determines that the packet (and the data packet, if specified) is to be forwarded and confirms availability of the appropriate packet buffers, the control logic then forwards the packet to the identified interface logic 18A–18C using the receive and transmit interface. The interface logic 18A–18C then subsequently forwards the packet to the receiving node. Also, control logic 66 notes that a buffer(s) of the corresponding type(s) has been freed (because the packet and the data packet, if specified, have been forwarded). An information packet may then be transmitted via the appropriate interface 18A–18C to inform the node on the receiving end of the availability of buffer(s).

If, however, the packet is destined for "this node", then control logic 66 processes the packet based upon the type of packet. For example, if the packet is a write request targeted at the memory controller 16A, control logic 66 attempts to convey the write request packet to memory controller 16A. Memory controller 16A may employ queues for transactions to be processed, and may refuse the write request packet if the queues are full, for example. If the received packet is a probe request packet, control logic 66 may communicate with caches 50 and 54 (and any caches internal to the processor cores 52 and 56) to determine the status of the cache block addressed by the probe. Control logic 66 may then respond to the probe by generating a probe response packet reporting the status of the addressed cache block (or a read response packet with the data, if the cache block has been modified) and then transmit the probe response packet if the receiving node has indicated the availability of appropriate packet buffers.

In addition to processing received packets, control logic 66 may generate packets in response to fill requests and victim blocks from the caches 50 and 54, as well as packets in response to requests directly from processor cores 52 and 56 (e.g. non-cacheable requests, I/O requests, etc.). Still further, response packets may be generated in response to the memory controller providing data for transmission or completing a transaction. Control logic 66 may generate a probe request packet in response to memory controller 16A selecting a corresponding request for processing, and may broadcast the probe request packet if receiving node buffers are available.

As mentioned above, a node allocates sufficient resources to process response packets received in response to a request packet transmitted by that node. In an exemplary embodiment, control logic 66 may transmit packets which may result in response packets being returned to the node in two cases: (i) when generating a request packet to initiate a transaction (e.g. in response to requests from caches 50 and 54 or processor cores 52 and 56); and (ii) when generating a probe request packet for a request packet targeting memory controller 16A. More particularly, case (ii) may occur for sized writes targeting memory controller 16A. In either case, control logic 66 allocates resources to provide for receiving and processing of the response packets.

In an exemplary embodiment, control logic 66 may allocate resources from data buffer pool 68 and response counter pool 70 for receiving and processing responses. Data buffer pool 68 may include a plurality of entries for storing cache blocks of data, while response counter pool 70 may comprise a plurality of counters. A data buffer pool entry may be allocated to store response data corresponding to the transaction. A counter may be allocated to count the responses received and retain any state information which may be provided in the probe responses. Response packets may be counted (e.g., until the expected number of responses is reached) using the allocated counter, and data received with a response packet may be stored in the allocated data buffer. It is noted that, at most, two response packets involved in a transaction may carry data (one from the targeted memory controller, if the MemCancel response packet does not reach the memory controller prior to transmission of the response packet, and one from a probed node which had a modified cached copy of the data). If two data packets are received, the packet from the probed node is retained and the packet from the memory controller is discarded.

Once each of the expected responses and the response data have been received, control logic 66 may transmit the data to memory controller 16A or caches 50 and 54, depending upon the type of transaction which has been performed. For example, if the responses are probe responses generated in response to a probe request generated by packet processing logic 58, the response data may be transmitted to memory controller 16A. Alternatively, if the responses have been generated as a result of a read transaction, the data may be transmitted to caches 50 or 54.

It is noted that data buffer pool 68 also may be used to store data to be transmitted from node 12A. For example, victim block data or write data for write requests sourced from node 12A may be stored in data buffer pool 68. Alternatively, separate buffers may be provided for such data. Furthermore, instead of providing a pool of buffers which may be used for various transactions, separate buffers may be provided for each transaction type.

Generally, as used herein, a buffer is a storage element used to store one or more items of information for later retrieval. The buffer may comprise one or more registers, latches, flip-flops, or other clocked storage devices. Alternatively, the buffer may comprise a suitably arranged set of random access memory (RAM) cells. The buffer is divided into a plurality of storage locations, each storage location being configured to store one item of information of the type for which the buffer is intended. Storage locations may be allocated and deallocated in any suitable fashion. For example, the buffer may be operated as shifting first-in, first-out (FIFO) buffer in which stored entries are shifted down in location as older entries are deleted. Alternatively, head and tail pointers may be used to indicate the oldest and most recent entry locations in the buffer, and entries may remain in a particular storage location of the buffer until deleted therefrom. The term "control logic", as used herein, refers to any combination of combinatorial logic and/or state machines which performs operations on inputs and generates outputs in response thereto to effectuate the operations described.

In an exemplary embodiment, packets are received from interface logic 18A–18C as a series of bit times. Interface logic 18A–18C indicate whether command or data bit times are being transmitted, and control logic 66 causes the appropriate buffers to store the bit times. Control logic 66 may use command packet active (CPA) registers 74 and data packet active (DPA) registers 76 to identify which virtual channel a packet which is currently being received is assigned. A CPA register 74 is provided for each interface logic 18A–18C (e.g. CPA 74A may correspond to interface 18A). Similarly, a DPA register 76 is provided for each interface logic 18A–18C (e.g. DPA register 76A may correspond to interface 18A).

Thus, in an exemplary embodiment, in response to the first bit time of a received packet, control logic 66 decodes the command field (which is in bit time 1) and determines to which virtual channel the received packet is assigned. Control logic 66 allocates a buffer location in the corresponding command packet buffer (within the set corresponding to the interface logic 18A–18C from which the packet is received) and sets the status of CPA register 76, which corresponds to the interface logic 18A–18C from which the packet is received, to indicate allocation of that command packet buffer location. Subsequent packet bit times from the same interface logic 18A–18C are stored in the indicated location in the indicated buffer until each bit time of the packet is received. Similarly, if the packet specifies a data packet, control logic 66 allocates a data packet buffer location in the data packet buffer corresponding to the identified virtual channel. Data packet bit times are stored in the indicated location of the indicated buffer until each bit time of data is received.

In an alternative embodiment, interface logic 18A–18C may gather the bit times of a packet and then transmit the entire packet to packet processing logic 58. In such embodiment, CPA registers 74 and DPA registers 96 may be eliminated. In yet another embodiment, interface logic 18A–18C may gather several bit times for concurrent transmission to packet processing logic 58, but the number of bit times may be less than a packet. In still another embodiment, buffers 60, 62, and 64 may be located within the respective interface logic 18A–18C instead of within packet processing logic 58.

The embodiment shown in FIG. 11 provides separate sets of buffers for each interface logic 18A–18C. In an alternative embodiment, the buffers may be provided as one or more buffer pools (for each virtual channel type) which may be divided between the interface logic. In such an embodiment, buffers need not be assigned to interface logic which is not coupled to another node (e.g. interface logic 18C in the example of FIG. 1), maximizing efficient use of the buffer pool. Thus, the buffers which would otherwise have been allocated to interface logic 18C may be allocated for use by interface logic 18A–18B.

Figure 12:
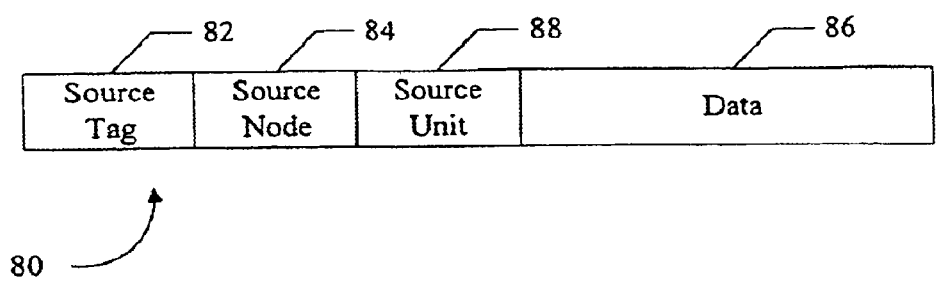
FIG. 12 is a block diagram of an exemplary embodiment of a location in the data buffer pool of FIG. 11.

Turning next to FIG. 12, a diagram illustrating one embodiment of a data buffer pool location 80 which may be in data buffer pool 68 is shown. Other embodiments are possible and contemplated. In the embodiment of FIG. 12, data buffer pool location 80 includes a source tag field 82, a source node field 84, a source unit field 88, and a data field 86.

When control logic 66 allocates data buffer pool location 80 to store a response data packet for a transaction, control logic 66 may store the source node, source unit, and source tag of the transaction in the source node field 84, source unit field 88, and the source tag field 82, respectively. Since the source node, source unit, and source tag uniquely identify an outstanding transaction, and the source node, source unit, and source tag are carried by response packets corresponding to the outstanding transaction, the response packets (and corresponding data packets) of the transaction may be identified by control logic 66 and the data packet can be stored into the allocated entry. For example, when a response packet specifying a response data packet is received, the source node, source unit, and source tag of the response packet may be compared against source node field 84, source unit field 88, and source tag field 84 to determine the data buffer pool location 80 previously allocated for response data. The response data then may be copied from the response data buffer into the data field 86 of the allocated data buffer pool location 80. In an exemplary embodiment, data field 86 may comprise a cache block of data.

Figure 13:
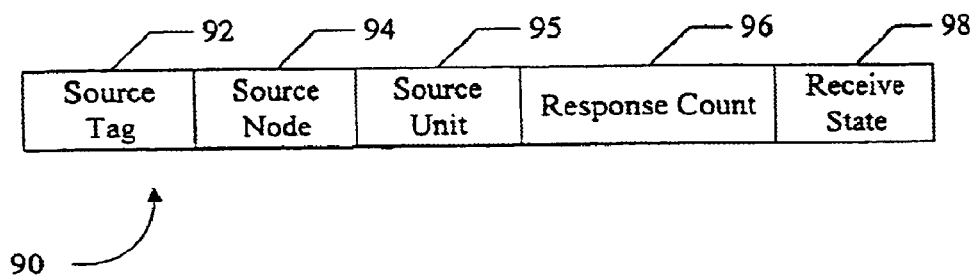
FIG. 13 is a block diagram of an exemplary embodiment of a location in the response counter pool of FIG. 11.

Turning next to FIG. 13, a diagram illustrating an exemplary embodiment of a response counter 80 which may be in response counter pool 70 is shown. Other embodiments are possible and contemplated. In the embodiment of FIG. 13, response counter 90 includes a source tag field 92, a source node field 94, a source unit field 95, a response count field 96, and a receive state field 98.

When control logic 66 allocates response counter 90 to store a response count for a transaction, control logic 66 may store the source node, source unit, and source tag of the transaction in the source node field 94, the source unit field 95, and the source tag field 92, respectively. The source node field 94, source unit field 95, and source tag field 92 may be used in a manner similar to the corresponding fields 84, 88, and 82 of the data buffer pool location 80.

Response count field 96 may be initialized, upon allocation to a transaction, to the number of responses expected for that transaction. As response packets having the source node, source unit, and source tag stored in fields 94, 95, and 92, respectively, are received, the response count may be decremented. When the response count reaches zero, all responses have been received and the transaction may be committed. Alternatively, the count may be initialized to zero and the response packets may cause increment of the response count until the expected number of responses are received.

Receive state field 98 may be used to indicate the state in which the data may be received. The state indicates the access rights to the cache block, as well as the responsibilities for maintaining coherency for the cache block, that node 12A acquired when it received the cache block. In an exemplary embodiment, the MOESI (Modified, Owned, Exclusive, Shared, and Invalid) coherency states may be employed and receive state field 98 may be encoded to one of the supported states. Alternatively, any other suitable set of coherency states may be employed (e.g. the MESI states). Receive state field 98 may be initialized to the state corresponding to the condition in which no other node has a copy of the cache block being transferred by the transaction. As responses are received, the receive state field may be updated. For example, if a probe response indicates that a copy of the cache block is being maintained by the probed node or that dirty data is being provided with the response, receive state field 98 may be updated accordingly. In one embodiment, a shared bit may be included in the probe response packet to indicate that a copy of the cache block is being maintained by the probed node providing the probe response. Additionally, receiving a read response packet from a probed node may indicate that the node had a dirty copy of the cache block. The read response packet may also include the shared bit to indicate whether a copy of the cache block is being maintained by the probed node.

It is noted that the implementation of the data buffer pool 68 and response counter pool 70 to allocate resources is exemplary only and that the allocation of resources to handle responses for outstanding transactions may be implemented in other manners. For example, a table of outstanding transactions may be maintained. The table may include the source node, source unit, source tag, data, receive state, and response count similar to the above or equivalent information allowing control logic 66 to determine whether all responses have been received.

Figure 14:
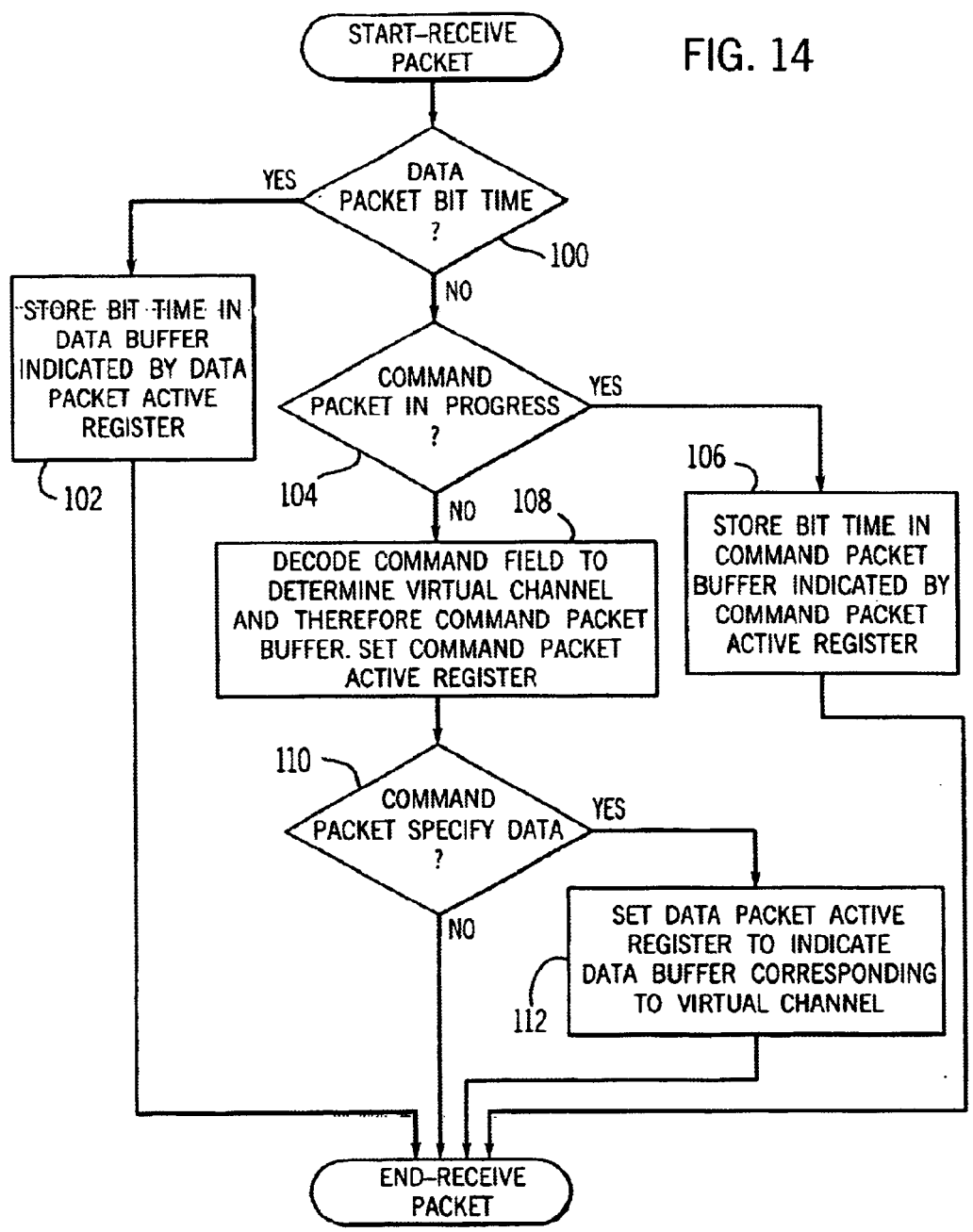
FIG. 14 is a flowchart of the operation of an exemplary embodiment of a portion of the packet processing logic of FIG. 10 for receiving packets.

Turning now to FIG. 14, a flowchart is shown of the operation of a portion of exemplary packet processing logic 58 for receiving a packet. Other embodiments are possible and contemplated. While the steps shown in FIG. 14 are illustrated in a particular order for ease of understanding, any suitable order may be used. Additionally, steps may be performed in parallel using combinatorial logic within packet processing logic 58. The steps illustrated in FIG. 14 may be performed in parallel and independently for each interface logic 18A–18C, since bit times may be received concurrently from each interface logic.

The embodiment illustrated in FIG. 14 receives packets into packet processing logic 58 as a series of bit times. Other embodiments may accumulate the bit times of a packet in interface logic 18A–18C and provide the complete packets to packet processing logic 58, in which cases steps related to managing the receipt of packets in bit times may be eliminated. In the embodiment illustrated in FIG. 14, when the bit times are received, packet processing logic 58 receives a signal from the interface logic indicating whether the received bit time is part of a data packet or a command packet. If the bit time is a data packet bit time (decision block 100), the bit time is stored in the data buffer in the allocated buffer location indicated by the data packet active register corresponding to that interface logic (step 102). If the data packet bit time is the last bit time of the data packet, control logic 66 may invalidate the corresponding data packet active register.

If, on the other hand, the bit time is a command packet bit time, packet processing logic 58 determines if a command packet is currently in progress of being received (e.g., if the command packet active register is valid, decision block 104). If a command packet is currently in progress, the bit time is stored in the command packet buffer indicated by the command packet active register (step 106). If the command packet bit time is the last bit time of the packet, control logic 66 may invalidate the corresponding command packet active register.

If a command packet is not currently in progress, packet processing logic 58 decodes the command field of the newly received packet to identify the virtual channel to which the packet is assigned (step 108). A command packet buffer location corresponding to the identified virtual channel is allocated, and the command packet bit time is stored in the allocated command packet buffer location.

Additionally, packet processing logic 58 determines if the command packet specifies a subsequent data packet (decision block 110). If a data packet is specified, packet processing logic 58 assigns a data buffer location from the data buffer corresponding to the identified virtual channel and updates the data packet active register to indicate the assigned data buffer and data buffer location (step 112).

Turning now to FIG. 15, a flowchart is shown of the operation of a portion of exemplary packet processing logic 58 for processing a request packet (e.g. either a non-posted request packet or a posted request packet). Other embodiments are possible and contemplated. While the steps shown in FIG. 15 are illustrated in a particular order for ease of understanding, any suitable order may be used. Additionally, steps may be performed in parallel using combinatorial logic within packet processing logic 58. The steps illustrated in FIG. 15 may be performed in parallel and independently for each interface logic 18A–18C and/or each command packet buffer, since request packets from different interfaces and/or different virtual channels are physically independent. Alternatively, one request packet (or one request packet per interface logic 18A–18C) may be selected for processing according to a suitable fairness algorithm. Generally, packets selected from one virtual channel for processing obey the ordering rules for packets within a virtual channel (e.g. packets from the same source to the same destination are selected in order) but, if desired, packets may be selected for processing out of order, provided the ordering rules allow out-of-order selection.

As illustrated in FIG. 15, packet processing logic 58 determines if the target of the request packet is "this node" (decision block 126). For example, packet processing logic 58 may compare the destination node ID recorded in the destination node (DestNode) field of the request packet to the node ID stored in node ID register 72. If the node IDs match, then the request is targeted for "this node". If the request is not targeted for "this node", packet processing logic 58 may forward the request packet (and corresponding data packet, if specified) to the appropriate destination node (step 128). For example, packet processing logic 58 may maintain packet routing tables which identify which interface logic 18A–18C is the transmitting interface for forwarding packets to a particular destination node. Packet processing logic 58 then forwards the request packet to the destination node via the identified interface logic 18 if logic 58 has also determined that a corresponding command buffer (and data buffer, if a data packet is specified) is available in the receiving node coupled to the link specified by the packet routing table. In certain embodiments, if the request packet specifies a data packet, logic 58 may delay forwarding of the request packet until logic 58 has received the specified data packet.

If the request packet is targeted for "this node", packet processing logic 58 may provide the request packet (and corresponding data packet, if applicable) to memory controller 16A (step 130). It is noted that, once the request packet is processed (i.e., either forwarded or accepted by "this node"), the request packet is removed from the command buffer and any corresponding data is removed from the command data buffer.

It is noted that probe requests may be processed in a similar fashion. However, because probe requests do not have corresponding data packets, the check for a data packet may be omitted. Furthermore, because probe requests may be broadcast packets, probe requests may be both processed internally (e.g. by probing caches within the node) and forwarded. Probed nodes, whether "this node" or another node, may generate and transmit a probe response packet after probing the caches.

It is noted that, if a selected request packet specifies a corresponding data packet, various embodiments may process the request packet even if the data packet has not yet been received. Alternatively, the node may await arrival of the data packet to simplify forwarding of the data or to allow another packet which specifies a data packet that has been completely received to be forwarded on the same link. If the data packet has not been received when the request packet is processed, the data packet may be handled as described above with respect to FIG. 14 when the data packet finally is received.

Figure 16:
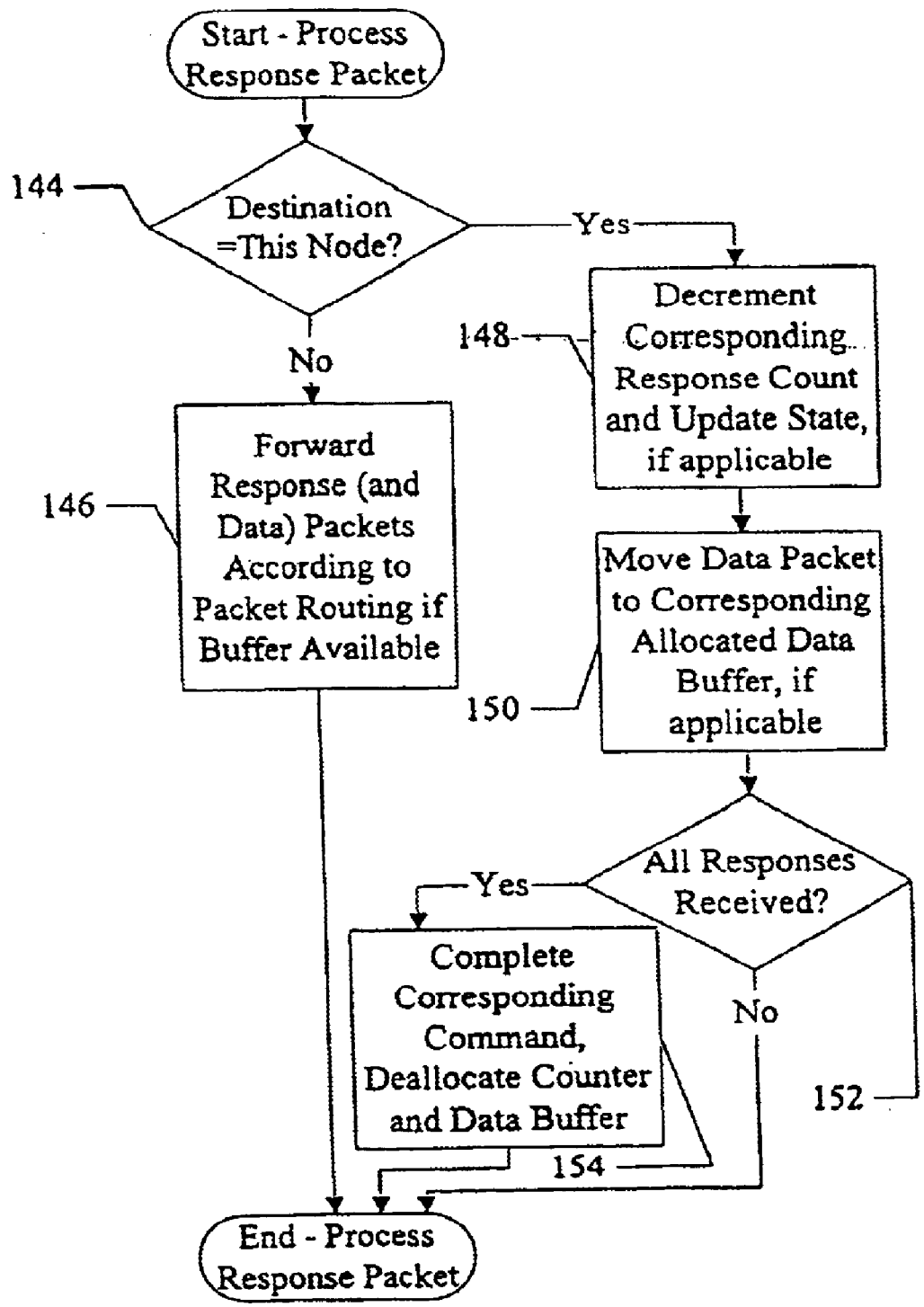
FIG. 16 is a flowchart of the operation of an exemplary embodiment of a portion of the packet processing logic of FIG. 10 for processing a response packet.

Turning now to FIG. 16, a flowchart is shown illustrating operation of a portion of exemplary packet processing logic 58 for processing a response packet. Other embodiments are possible and contemplated. While the steps shown in FIG. 16 are illustrated in a particular order for ease of understanding, any suitable order may be used. Additionally, steps may be performed in parallel using combinatorial logic within packet processing logic 58. The steps illustrated in FIG. 16 may be performed in parallel and independently for each interface logic 18A–18C and/or each response packet buffer, since packets from different interfaces and/or different virtual channels are physically independent.

As shown in FIG. 16, packet processing logic 58 determines if the destination node of the response packet is "this node" (decision block 144) in substantially the same manner as described above. If the destination node is another node, packet processing logic 58 forwards the response packet (and corresponding data packet, if applicable) if a free buffer location for the response virtual channel in the receiver node on the link to which the response packet is forwarded is available (step 146).

If the destination of the response packet is "this node", packet processing logic 58 decrements the corresponding response counter and updates the received state (if the response is a probe response indicating that the received state should be changed from the default state) (step 148). Additionally, if the response packet specifies a data packet, the data packet is moved from the corresponding response data buffer to the data buffer allocated to that response (step 150).

After decrementing the counter, packet processing logic may test the counter to determine if all the response packets have been received and processed (decision block 152). If the determination is that all the response packets have been received and processed, packet processing logic 58 may inform memory controller 16A or caches 50 and 54 that they may complete the transaction, and provide the associated data from the data buffer and received state from the response counter (if applicable (step 154)). It is noted that, once the response packet is processed (i.e., either forwarded or accepted by "this node"), the response packet is removed from the response buffer and any corresponding response data is removed from the response data buffer.

It is noted that, in certain embodiments, if a selected response packet specifies a corresponding data packet, the response packet may be processed even if the data packet has not yet been received (i.e. the data packet is not yet in the data buffer), or response packet processing may await arrival of the data packet to simplify forwarding of the data or to allow another packet which specifies a data packet which has been completely received to be forwarded on the same link. If the data packet has not been received when the response packet is processed, the data packet may be handled as described above with respect to FIG. 14 when the data packet finally is received.

Figure 17:
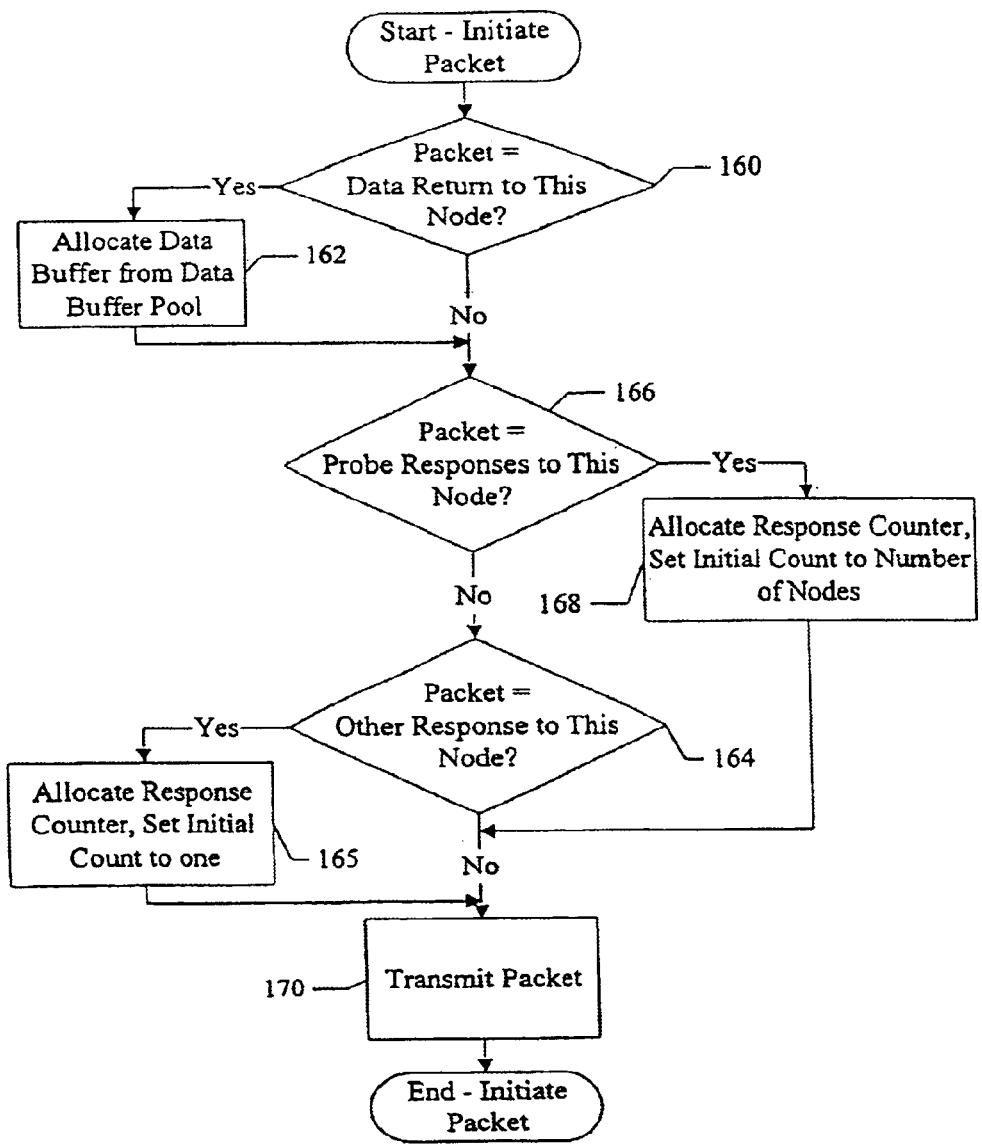
FIG. 17 is a flowchart of the operation of an exemplary embodiment of a portion of the packet processing logic of FIG. 10 for initiating a packet.

Turning now to FIG. 17, a flowchart is shown illustrating operation of a portion of exemplary packet processing logic 58 for initiating a packet on the communication links to which the node is coupled. Other embodiments are possible and contemplated. While the steps shown in FIG. 17 are illustrated in a particular order for ease of understanding, any suitable order may be used. Additionally, steps may be performed in parallel using combinatorial logic within packet processing logic 58. Packet processing logic 58 may initiate packets on the link in response to fill requests/victim blocks from the caches 50 and 54 and/or operations performed by processor cores 52 and 56. Additionally, probe packets may be initiated in response to the memory controller 16A selecting a memory operation for processing. Response packets may be initiated after probes have been processed, and in response to completion of a transaction sourced by "this node" or targeted for "this node".

As illustrated in FIG. 12, packet processing logic 58 determines if the packet to be initiated may result in data being return to this node (decision block 160). For example, read transactions initiated by the node cause data to be returned to the node, while write transactions initiated by the node do not cause data to be returned to the node. ChangetoDirty transactions may result in data being returned to the node (if another node has the affected cache block in a dirty state). Similarly, probe packets may cause data to be returned to this node if another node has the affected cache block in a dirty state and the probe responses are to be directed at this node. If the transaction may result in data being returned to this node, packet processing logic 58 allocates a data buffer from data buffer pool 68 (step 162).

Additionally, packet processing logic 58 determines if probe responses will be returned to this node in response to the packet (step 166). Return of probe responses may occur if the packet is a probe, or if the packet is initiating a transaction resulting in probe responses to "this node" (e.g., a read transaction). If probe responses will be returned to "this node", packet processing logic 58 allocates a response counter to count received responses to the transaction and initializes the response counter to the number of expected responses (e.g., the number of nodes in the coherent fabric) (step 168).

Packet processing logic 58 further determines if other responses will be returned to this node (e.g. SrcDone, TgtDone, etc.) in response to the packet being initiated (step 164). If such other responses are to be returned, packet processing logic 58 allocates a response counter and sets the initial count, for example, to one or any other appropriate starting count (step 165). Subsequently, packet processing logic 58 transmits the packet (step 170).

By preallocating resources to handle response packets (including data) prior to initiating a transaction, response packets can be processed upon receipt. Accordingly, even though some response packets may have logical/protocol conflicts with other response packets, response packets may be merged into the response virtual channel because physical conflicts are eliminated by processing each response packet upon receipt at its destination node.

Turning next to FIG. 18, a block diagram illustrating one embodiment of an info packet 180 including buffer release fields is shown. Other embodiments are possible and contemplated. In the exemplary embodiment illustrated in FIG. 18, a buffer release field is included for each buffer type. The RespData field corresponds to the response data buffer, and the Response field corresponds to the response buffer. Similarly, the PostCmdData field corresponds to the posted command data buffer, and the PostCmd field corresponds to the posted command buffer. The NonPostData field corresponds to the non-posted command data buffer, and the NonPostCmd field corresponds to the non-posted command buffer. The Probe field corresponds to the probe buffer.

Each of the buffer release fields includes two bits, allowing for the release, or freeing, of up to three buffer locations of each type via the transmission of a single info packet 180 from a transmitter to a receiver on a particular communication link. If more than three buffer locations of a particular type are provided, additional info packets may be used to free the additional buffer locations, if desired. Packet processing logic 58 may include buffer counts for each type of buffer and each interface logic 18A–18C, indicating the total number of buffers of each type which are provided by the receiver on the other end of the link to which each interface is coupled. These counters may be initialized at power up by transmitting info packets from the receiver to the transmitter with the buffer release fields set to the number of buffer locations available in that receiver. If the receiver has more than three buffer locations of a particular type, multiple info packets may be transmitted.

Packet processing logic 58 may transmit packets in a particular virtual channel as long as a buffer of the corresponding type (and a data buffer, if the packet specifies a data packet) is available in the receiver to which the packets are being transmitted. Additionally, packet processing logic 58 notes the number of buffer locations of each type for each interface 18A–18C that are have been freed in node 12A as a result of the processing of packets by packet processing logic 58. Periodically, packet processing logic 58 transmits an info packet 180 via each interface logic 18A–18C, indicating to the transmitter on the respective communication link the number of buffer locations which have been freed by packet processing logic 58.

Virtual Channels—Noncoherent Fabric

Turning now to FIG. 19, a block diagram of one embodiment of an I/O subsystem 200 is shown. Other embodiments are possible and contemplated. In the embodiment of FIG. 19, I/O subsystem 200 includes a host bridge 202 and a plurality of I/O nodes 204A, 204B, and 204C. Host bridge 202 is coupled to processing node 12D via a coherent link comprising lines 24I–24J, and is further coupled to I/O node 204A via a noncoherent link comprising lines 24K–24L. I/O nodes 204A–204C are interconnected via additional noncoherent links in a daisy chain configuration (lines 24N–24O). It is noted that, while host bridge 202 is shown separate from the processing nodes 12, host bridge 202 may be integrated into a processing node, if desired.

Generally, host bridge 202 translates packets moving between the I/O subsystem and the processing nodes. For example, a non-coherent packet transmitted by I/O node 204B and having a target within processing node 12A passes through I/O node 204A to host bridge 202. Host bridge 202 translates the non-coherent packet to a corresponding coherent packet.

Generally, an I/O node 204A–204C may initiate transactions within I/O subsystem 200. The transactions may ultimately be targeted at another I/O node 204A–204C, an I/O node on another noncoherent link, or a memory 14. For simplicity, a transaction may be performed between the host bridge 202 and an I/O node 204A–204C despite the actual target. For example, host bridge 202 may initiate transactions within I/O subsystem 200 on behalf of a request from processing nodes 12A–12D, and may handle transactions initiated by I/O nodes 204A–204C which are targeted at the coherent fabric or another host bridge within the computer system.

Packets in I/O subsystem 200 travel in I/O streams, which are groupings of traffic that can be treated independently by the noncoherent fabric. In an exemplary embodiment, peer-to-peer communications do not exist within the noncoherent fabric, and all packets may travel either to or from host bridge 202. Accordingly, packets transmitted by an I/O node 204A–204C may flow toward host bridge 202 through the daisy chain connection (i.e., "upstream"). It should be noted that request packets issued by an I/O node 204A–204C contain the UnitID of the source node. Similarly, response packets issued by an I/O node 204A–204C contain the UnitID of the node which generated the response. Accordingly, the UnitID may be used to identify I/O streams for upstream packets.

Packets transmitted by host bridge 202 may flow toward the receiving I/O node 204A–204C (i.e., "downstream"). It should be noted that, in an exemplary embodiment, downstream responses contain the UnitID of the node to which the response is being sent, while downstream requests have a zero value for the UnitID, which is the encoding reserved for host bridge 202. Thus, independent I/O streams may not discernible in the downstream request traffic, and it may be assumed that all downstream traffic (both requests and responses) are in the same I/O stream.

All devices on the fabric are programmed to think of the direction of their host bridge as "upstream". By interconnecting the I/O nodes and the host bridge in a daisy chain and having I/O nodes communicate (at the transaction level) only with the host bridge provides a logical view of I/O subsystem 200 in which the I/O nodes appear to be connected directly to the host bridge but not the other nodes.

I/O subsystem 200 may be connected to a host bridge on both ends of the daisy chain interconnection to provide for robustness in the event of a link failure or to allow a shared I/O subsystem between clusters of processing nodes. The bridge at a first end of the daisy chain may be designated the master bridge and the bridge at the other end may be designated the slave bridge. In an exemplary embodiment, all I/O nodes in the subsystem belong to the master bridge. Upon detection of a link failure, the I/O nodes on each side of the failure are reprogrammed to belong to the host bridge on the respective side of the failure. Thus, two I/O subsystems are formed and communication with the processing nodes in the processing subsystem can be maintained. In alternative embodiments, the I/O nodes may be apportioned between the two host bridges in the I/O subsystem even in the absence of a link failure. Such a configuration may assist in balancing communication traffic.

If a packet reaches the end of the daisy chain (e.g. I/O node 204C in the example of FIG. 19) and an I/O node 204A–204C has not accepted the packet, an error may be generated by the I/O node at the end of the chain.

Generally, I/O subsystem 200 implements the links 24K–24P as a noncoherent interconnect. In an exemplary embodiment, the data packet definition for the noncoherent link is similar to that shown and described in FIG. 6 with respect to the data packet definition for the coherent link. Likewise, the info packet definition for the noncoherent link may be similar to the coherent info packet definitions shown in FIGS. 3 and 18 (with the Probe field being reserved). The request and response packet definitions for the noncoherent link are illustrated in FIGS. 21 and 22 and will be described below.

In an exemplary embodiment, the virtual channel definitions described above with respect to the coherent link are also applicable to the noncoherent link. The virtual channel definitions and their respective applicable links are set forth in FIG. 9. It is noted that probe requests may not be used on the noncoherent link and, thus, the probe virtual channel may be eliminated for noncoherent link.

Turning now to FIG. 20, a table 210 is shown illustrating packets employed according to one exemplary embodiment of the noncoherent link within computer system 10. Other embodiments are possible and contemplated, including any other suitable set of packets and command field encodings. Table 210 includes a command code (CMD) column illustrating the command encodings assigned to each command, a virtual channel (Vchan) column defining the virtual channel to which each of the noncoherent packets are assigned, a command (Command) column including a mnemonic representing the command, and a packet type (Packet Type) column indicating which of packets 30, 212, and 214 (and data packet 36, where specified) is employed for the corresponding command.

As illustrated in table 210, the noncoherent packets include the NOP, Wr(Sized), Read(Sized), RdResponse, TgtDone, Broadcast, and Sync packets, which, in an exemplary embodiment, are similar to the corresponding coherent packets described with respect to FIG. 7. It is noted, however, that in the noncoherent link, neither probe packets nor probe response packets are issued. As described above with respect to the coherent link, posted write requests may be identified by setting a posted bit of the Wr(Sized) request packet. However, in the noncoherent fabric, a set posted bit not only serves as a virtual channel identifier, but also indicates that the write request will receive no response in the fabric. That is, unlike the coherent fabric, a TgtDone response packet is not issued in the non-coherent fabric in response to a posted write request.

The noncoherent packets also include the Flush and Fence request packets, which will be described in further detail below.

Turning next to FIG. 21, a block diagram of one embodiment of a request packet 212 which may be employed in the noncoherent link is shown. Request packet 212 includes a command field (CMD[5:0]) similar to the coherent request packet. Further, an optional source tag field (SrcTag[4:0]) may be included in bit time 2, similar to the coherent request packet. The address (Addr[15:8], Addr[23:16], Addr[31:24], Addr[39:32]) is included in bit times 4–7 (and optionally in bit time 3 for the least significant address bits).

Request packet 212 further includes a unit ID (UnitID [4:0]) in bit time 1 (rather than the source node ID of the coherent counterpart packet). Unit IDs identify the logical source of the packets. An I/O node may have multiple unit IDs if, for example, the node includes multiple devices or functions which are logically separate. Accordingly, an I/O node may generate and accept packets having different unit IDs. In one embodiment, the unit ID may comprise five bits. Accordingly, if unit ID 0 is assigned to the host bridge, and unit ID 31 is used to report errors, up to thirty unit IDs may exist in the I/O nodes coupled in one daisy-chained I/O subsystem.

Additionally, request packet 212 includes a sequence ID (SeqID[3:0]) field in bit times 0 and 1. The SeqID field may be used to group and order a set of two or more request packets that are traveling in the same virtual channel and have the same unit ID. For example, if the SeqID field is zero, a packet is unordered with respect to other packets. If, however, the SeqID field has a non-zero value, the packet is ordered with respect to other packets in the same channel having a matching value in the SeqID field and the same UnitID.

Still further, request packet 212 includes a pass posted write (PassPW) bit in bit time 1. The PassPW bit indicates whether request packet 212 is allowed to pass posted write requests transmitted from the same unit ID. In an exemplary embodiment, if the PassPW bit is clear, the packet is not allowed to pass a previously transmitted posted write request packet. If the PassPW bit is set, the packet is allowed to pass prior posted write packets. For read request packets, the command field may include a bit having a state which indicates whether read responses may pass posted write requests. The state of that bit determines the state of the PassPW bit in the response packet corresponding to the read request packet.

As discussed above, the non-coherent request packets include the Flush and Fence requests. The Flush request may be used by a source node to ensure that one or more previously issued posted writes have been observed at host memory. A Flush applies only to requests in the same I/O stream as the Flush and may only be issued in the upstream direction. To perform its intended function, the Flush request travels in the non-posted command virtual channel and pushes all requests in the posted command channel ahead of it (e.g., via the PassPW bit described below). Thus, issuing a Flush request and receiving a corresponding TgtDone response packet allows the source node to determine that previous posted requests have been flushed to their destinations within the coherent fabric.

The Fence request provides a barrier between posted writes which applies across all UnitIDs in the I/O system. A Fence request may be issued only in the upstream direction and travels in the posted command virtual channel. To perform its intended function, the Fence request pushes all posted requests in the posted command channel ahead of it. For example, if the PassPW bit is clear, the Fence packet will not pass any packet in the posted channel, regardless of the packet's UnitID. Other packets having PassPW bit clear will not pass a Fence packet regardless of UnitID.

Turning next to FIG. 22, a block diagram of one embodiment of a response packet 214 which may be employed in the noncoherent link is shown. Response packet 214 includes a command (CMD[5:0]) field, a unit ID (UnitID [4:0]) field, a source tag (SrcTag[4:0]) field, and a PassPW bit similar to the request packet 212. However, it should be understood that other fields and bits may be included as desired.

Figure 23:
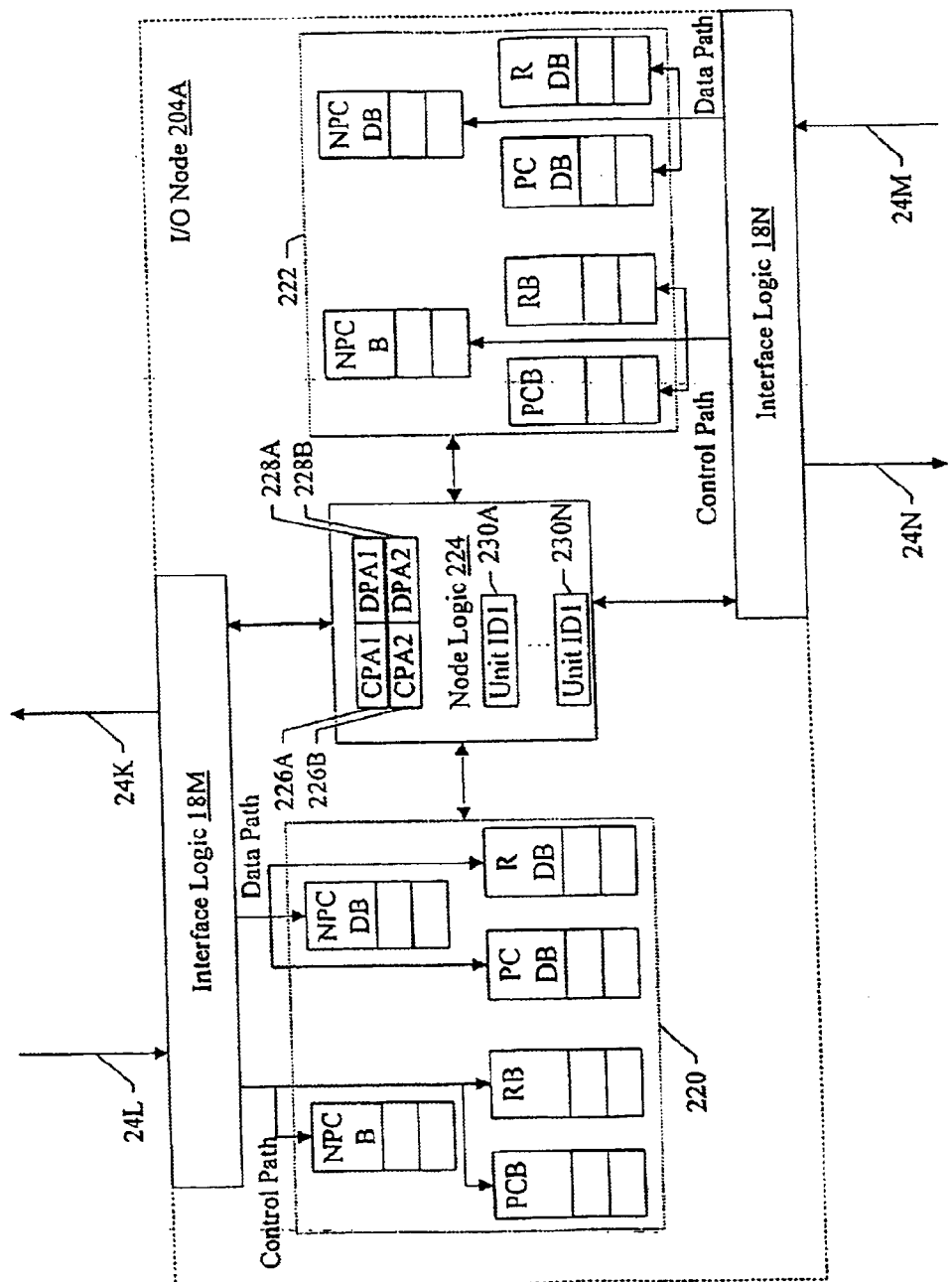
FIG. 23 is a block diagram of an exemplary embodiment of an I/O node of the I/O subsystem of FIG. 19, the I/O node including node logic.

Turning now to FIG. 23, a block diagram illustrating one embodiment of I/O node 204A is shown. Other I/O nodes 204B–204C may be configured similarly. Other embodiments are possible and contemplated. In the embodiment of FIG. 23, I/O node 204A includes interface logic 18M and 18N, a first set of packet buffers 220, a second set of packet buffers 222, and a node logic 224. Interface logic 18M is coupled to lines 24K and 24L, packet buffers 220, and node logic 224. Interface logic 18N is coupled to lines 24M and 24N, packet buffers 222, and node logic 224. Node logic 224 is further coupled to packet buffers 220 and 222.

Interface logic 18M and 18N are configured to receive packets from lines 24L and 24M (respectively) and to transmit packets on lines 24K and 24N (respectively). Similar to the interface logic described above for the coherent link, interface logic 18M and 18N may separate received packets into a control path and a data path. The control path is coupled to the command packet buffers and the data path is coupled to the data packet buffers. Alternatively, the interface logic 18M and 18N may not separate received packets into control and data paths and, instead, node logic 224 may receive the CTL signal corresponding to each bit time and perform the separation in accordance therewith. Similar to the coherent interface, packet buffers 220 and 222 each include a buffer for each virtual channel in the noncoherent link. That is, buffers 220 and 222 include a posted command buffer (PCB), a non-posted command buffer (NPCB), and a response buffer (RB) for command packets, corresponding to the three virtual channels implemented in the noncoherent link. Additionally, buffers 220 and 222 include data packet buffers for each virtual channel (e.g., a posted command data buffer (PCDB), a non-posted command data buffer (NPCDB), and a response data buffer (RDB)).

Node logic 224 may process packets received into buffers 220 and 222, and may initiate packets in response to peripheral functionality implemented by I/O node 204A. Similar to control logic 66 shown in FIG. 11, node logic 224 may implement command packet active registers 226A and 226B (corresponding to packet buffers 220 and 222, respectively) and data packet active registers 228A and 228B (corresponding to packet buffers 220 and 222, respectively). Additionally, because communications on the noncoherent link correspond to unit IDs instead of node IDs, node logic 224 may include one or more unit ID registers 230A–230N to store the unit IDs assigned to I/O node 204A. The number of unit ID registers 230A–230N may vary from node to node, according to the number of unit IDs implemented within that I/O node.

Because packets in different virtual channels are stored in different buffers within I/O node 204A, packets in different virtual channels do not physically conflict with each other. Hence, substantially deadlock-free operation may be achieved. Additionally, node logic 224 may preallocate resources to handle response packets and response data (as described above with respect to the coherent link), such that response packets may be merged into a single virtual channel.

Node logic 224 may further include logic corresponding to the various I/O or peripheral functions performed by I/O node 204A. For example, I/O node 204A may include storage peripherals such as disk drives, CD ROMs, DVD drives, etc. I/O node 204A may include communications peripherals such as IEEE 1394, Ethernet, Universal Serial Bus (USB), Peripheral Component Interconnect (PCI) bus, modem, etc. Any suitable I/O function may be included in I/O node 204A.

Figure 24:
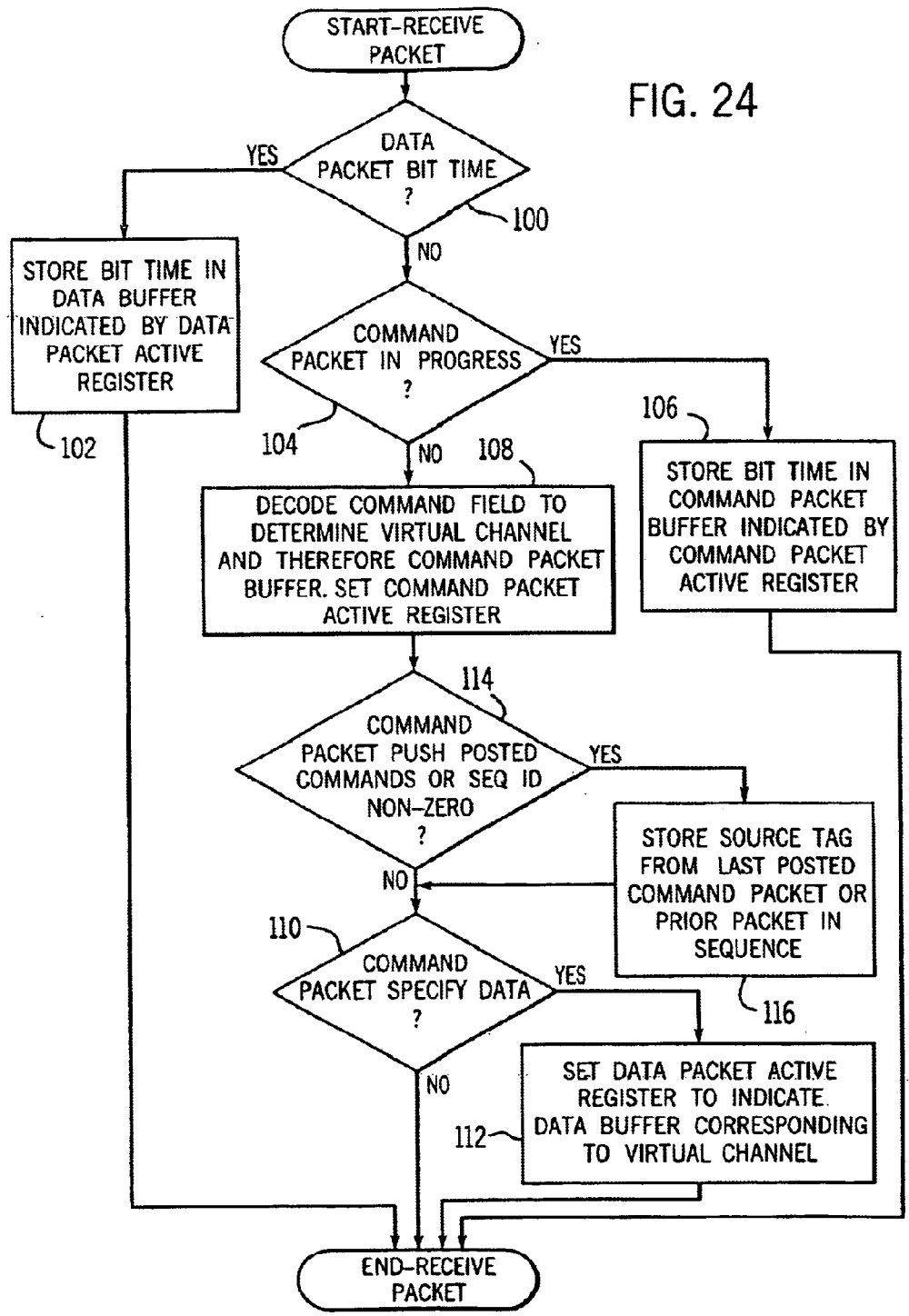
FIG. 24 is a flowchart of the operation of an exemplary portion of the node logic of FIG. 23 for packet reception.

Turning now to FIG. 24, a flowchart is shown of the operation of a portion of exemplary node logic 224 for receiving a packet. Other embodiments are possible and contemplated. While the steps shown in FIG. 24 are illustrated in a particular order for ease of understanding, any suitable order may be used. Additionally, steps may be performed in parallel using combinatorial logic within node logic 224. The steps illustrated in FIG. 24 may be performed in parallel and independently for each interface logic 18M–18N, since bit times may be received concurrently from each interface logic.

In the embodiment illustrated in FIG. 24, packets are received into buffers 220 and 222 as a series of bit times. Other embodiments may accumulate the bit times of a packet in interface logic 18M–18N and provide the complete packets to buffers 220 and 222, in which case steps related to managing the receipt of packets in bit times may be eliminated. In FIG. 24, steps 100–112 may be the same or similar to the corresponding steps 100–112 described with respect to FIG. 14 above. However, node logic 224 may implement certain additional ordering rules, as illustrated in part by steps 114 and 116 in FIG. 24. Certain command packets may be configured to "push" posted request packets that have been transmitted from the same source node. In other words, the pushed posted request packets arrive at the destination node prior to the other packets reaching their destination nodes.

In one embodiment, for example, Flush request packets (which are defined to have the PassPW bit clear), as well as other packets having their the PassPW bit clear, may be defined to push posted request packets, as discussed above. Furthermore, request packets having non-zero value in their SeqID field are defined to push prior request packets, which are in the same I/O stream and have a matching value in their respective SeqID field. Accordingly, if a packet is received that has the PassPW bit clear or a non-zero value in the SeqID field (decision block 114), node logic 224 may search for prior request packets in the posted command buffers and the command virtual channels. For example, node logic 224 may search the posted command buffer for a posted request packet having the same unit ID as the packet having the clear PassPW bit. Further, node logic 224 may search the command virtual channels for request packets having a non-zero value in the SeqID field that matches the received packet's sequence ID. If the node logic 224 detects a prior request packet, the source tag (SrcTag) of the prior request packet may be saved. For example, the SrcTag of the prior request packet may be stored in the same buffer location that is allocated to the request packet (step 116). Node logic 224 may then withhold processing of the request packet until the corresponding prior request packets have been processed.

Figure 25:
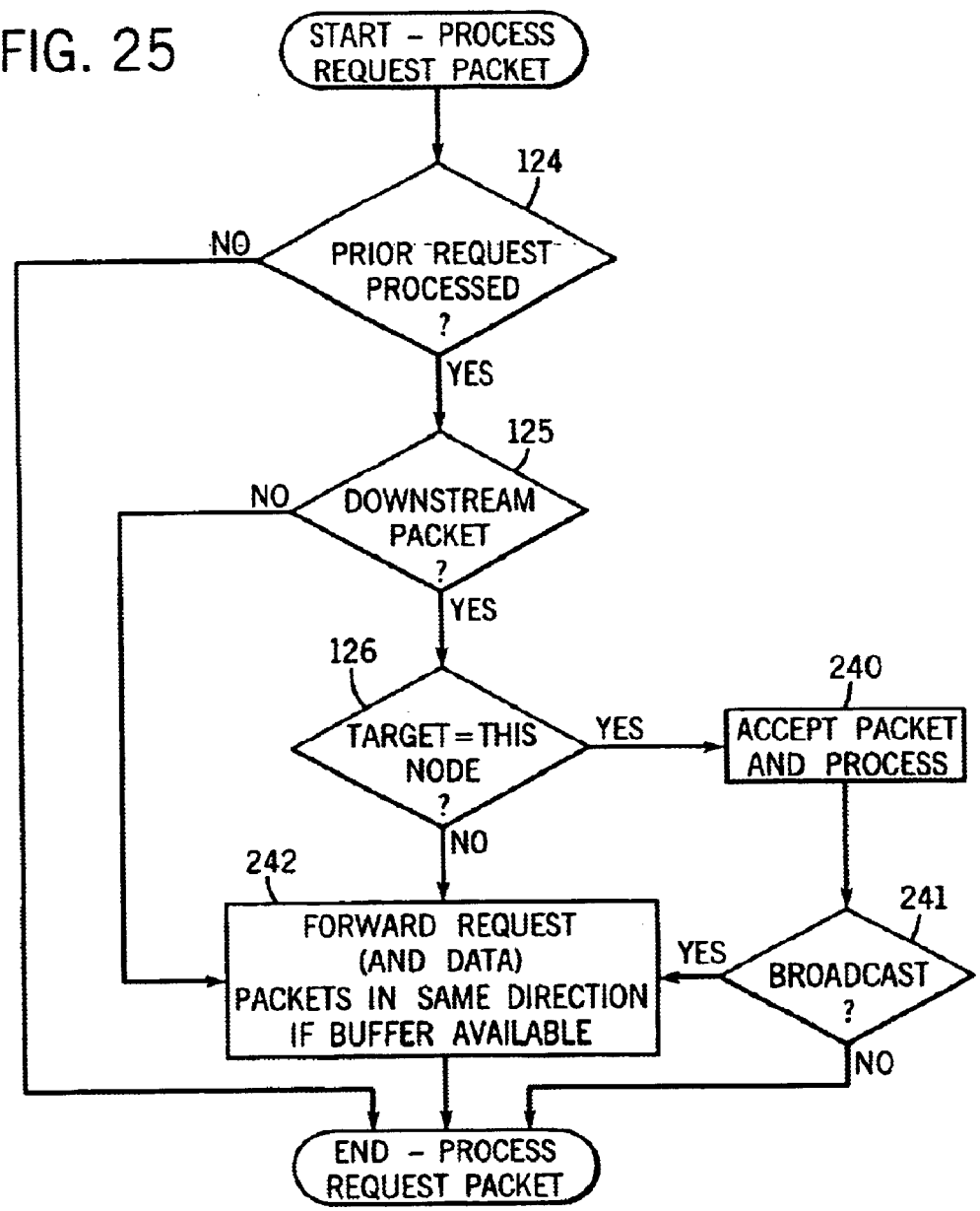
FIG. 25 is a flowchart of the operation of an exemplary portion of the node logic of FIG. 24 for processing request packets.

Turning now to FIG. 25, a flowchart is shown illustrating operation of one embodiment of node logic 224 for processing a request packet (e.g. a non-posted request packet or a posted request packet). Other embodiments are possible and contemplated. While the steps shown in FIG. 25 are illustrated in a particular order for ease of understanding, any suitable order may be used. Additionally, steps may be performed in parallel using combinatorial logic within node logic 224. The steps illustrated in FIG. 25 may be performed in parallel and independently for each interface logic 18M–18N and/or each command packet buffer, since request packets from different interface and/or different virtual channels are physically independent. Alternatively, one request packet (or one request packet per interface logic 18M–18N) may be selected for processing according to a suitable fairness algorithm. Generally, packets selected from one virtual channel for processing obey the ordering rules for packets within a virtual channel (e.g. packets from the same source to the same destination are selected in order) but packets may be selected for processing out of order, if desired, and if the ordering rules allow out-of-order selection.

If the request packet is flowing downstream (step 125), node logic 224 decodes the address in the request packet to determine whether the packet should be accepted (step 126). If, however, the downstream request packet is a broadcast (step 241), the node both accepts and forwards the packet regardless of other criteria. Further, node logic 224 may implement an additional step prior to processing a request packet. For example, in decision block 124, node logic 224 determines if the request packet is configured to push a prior request packet which has not yet been processed. As described above, if a request packet is received and is configured to push prior request packets (e.g., via the non-zero value in the SeqID field or the state of the PassPW bit), the source tag (SrcTag) of the request packet to be pushed is recorded. Node logic 224 may search for a prior request packet by scanning the command buffers for the source tag (and unit ID) corresponding to the pushing request packet. If a stored request packet having the source tag and unit ID is found, then processing of the pushing request packet may be suspended until the prior stored request packet is processed.

Additionally, node logic 224 is configured to forward a request packet in the same direction (upstream or downstream) rather than according to a packet routing table (step 242). If the packet is flowing upstream, the packet is never accepted by "this node", and instead is forwarded until it reaches the host bridge. It is noted that, once the packet is processed (e.g., either forwarded or accepted by "this node"), the packet is removed from the corresponding buffer location and, if applicable, the associated data packet is removed from the data buffer location.

It is further noted, if a selected request packet specifies a corresponding data packet, various embodiments may process the request packet even if the data packet has not yet been received. Alternatively, processing may be delayed until arrival of the complete data packet, thus simplifying forwarding of the data packet or allowing another packet, which specifies a data packet that has completely arrived, to be forwarded on the same communication link. In situations in which processing of the request packet does not await arrival of a complete data packet, the data packet may be handled as described above with respect to FIG. 24 when the data packet finally is completely received.

Turning now to FIG. 26, a flowchart is shown illustrating operation of one embodiment of node logic 224 for processing a response packet. Other embodiments are possible and contemplated. While the steps shown in FIG. 26 are illustrated in a particular order for ease of understanding, any suitable order may be used. Additionally, steps may be performed in parallel using combinatorial logic within node logic 224. The steps illustrated in FIG. 26 may be performed in parallel and independently for each interface logic 18M–18N and/or each response packet buffer, since packets from different interfaces and/or different virtual channels are physically independent.

If the packet is flowing downstream (step 249), node logic 224 determines whether to accept the packet by examining unit IDs recorded in the UnitID fields of the response packets and in unit ID registers 230A–230N (step 144, which is similar to the corresponding step 144 of FIG. 16). As discussed above, in downstream response packets, the UnitID is the source of the original request packet which caused issuance of the response. If, however, the response packet is flowing upstream, the packet is not accepted but instead is forwarded until it reaches the host bridge. In upstream response packets, the UnitID is the target node of the request (i.e., the node issuing the response).

Similar to the flowchart of FIG. 25, node logic 224 may implement an additional check prior to processing a response packet. For example, in decision block 140, node logic 224 determines if the response packet is configured to push a prior request packet which has not been processed. As described above, if a response packet is received and is configured to push prior request packets (e.g., via the PassPW bit), the source tag of the request packet to be pushed when the response packet is received is recorded. Node logic 224 may scan the command buffers for a request packet having the source tag (and unit ID) corresponding to the response packet. If a stored request packet having the source tag and unit ID is found, then processing of the response packet may be suspended until the prior request packet is processed.

If the destination node for the response packet is another node, node logic 224 forwards the response packet (and corresponding data packet, if applicable) subject to availability of a free buffer location for the response virtual channel in the receiver to which the response packet is forwarded (step 250). In an exemplary embodiment, the receiver is a node which allows the response packet to flow in the same direction (upstream or downstream) as the packet already was flowing.

If the destination node of the response packet is "this node", node logic 224 is configured to move the corresponding data packet, if any, from the corresponding response data buffer to the data buffer allocated to the response packet (step 252). Node logic 224 then completes processing of the corresponding response packet, and deallocates the data buffer (step 254). It is noted that, once the response packet is processed (i.e., either forwarded or accepted by "this node"), the response packet is removed from the response buffer location and, if applicable, the corresponding data packet is removed from the data buffer location.

It is noted that, if a selected response packet specifies a corresponding data packet, various embodiments may process the response packet even if the data packet has not yet been arrived. Alternatively, processing may be delayed until arrival of the data packet, thus simplifying forwarding of the data or allowing another packet, which specifies a data packet that is completely received, to be forwarded on the same link. In situations in which processing of the response packet is not delayed, the corresponding data packet may be handled as described above with respect to FIG. 24 when the data packet finally is received.

Turning now to FIG. 27, a flowchart is shown illustrating operation of one embodiment of node logic 224 for initiating a packet on the links to which the node is coupled. Other embodiments are possible and contemplated. While the steps shown in FIG. 27 are illustrated in a particular order for ease of understanding, any suitable order may be used. Additionally, steps may be performed in parallel using combinatorial logic within node logic 224.

As illustrated in FIG. 27, node logic 224 determines if the transaction to be initiated may result in data being return to "this node" (decision block 260). For example, read transactions initiated by "this node" cause data to be returned to "this node", while write transactions initiated by "this node" do not cause data to be returned to "this node". If the transaction may result in data being returned to "this node", node logic 224 allocates a data buffer to store the returned data (step 262). Subsequently, node logic 224 transmits the packet (step 264).

Turning now to FIG. 28, a table 270 is shown illustration operation of one embodiment of host bridge 202 in response to a pair of ordered requests received from a particular unit within the noncoherent fabric. The only ordering rule provided by the coherent fabric itself is that packets travelling in the same virtual channel, from the same source to the same destination, are guaranteed to remain in order. However, due to the distributed nature of the coherent fabric, I/O streams entering the coherent fabric may be spread over multiple targets. Thus, to guarantee ordering from the point of view of all observers, the host bridge waits for responses to prior packets before issuing new packets into the coherent fabric. In this manner, the host bridge may determine that the prior packets have progressed far enough into the coherent fabric for subsequent packets to be issued without distributing ordering.

The host bridge may determine which of the packets coming from the non-coherent fabric have ordering requirements. Such a determination may be accomplished by examining the command encoding, UnitID, SeqID, PassPW fields in each of the packets. Unordered packets require no special action by the host bridge; they may be issued to the coherent fabric in any order as quickly as the host bridge can send them out. Ordered packets, on the other hand, have various wait requirements which are listed in table 270.

Table 270 includes a Request, column listing the first request of the ordered pair, a Request$_2$ column listing the second request of the ordered pair, and a wait requirements column listing responses that must be received before the host bridge may allow the second request to proceed.

Unless otherwise indicated in table 270, the referenced packets are on the coherent fabric. Also, in an exemplary embodiment, combinations of requests which are not listed in table 270 do not have wait requirements. Still further, table 270 applies only if host bridge 202 first determines that ordering requirements exist between two request packets. For example, ordering requirements may exist if the two request packets have matching non-zero sequence IDs, or if the first request packet is a posted write and the second request has the PassPW bit clear.

In the first entry of table 270, a pair of ordered memory write requests are completed by the host bridge by delaying transmission of the second memory write request unit a TgtStart packet corresponding to the first memory write request is received in the coherent fabric by the host bridge. Additionally, the host bridge withholds a SrcDone packet corresponding to the second memory write request until a TgtDone packet corresponding to the first memory write request has been received. Finally, the TgtDone packet corresponding to the second memory write request on the non-coherent link (if the memory write is a non-posted request) is delayed until the TgtDone packet corresponding to the first memory write request has been received from the coherent fabric. The other entries in the table of FIG. 28 may be interpreted in a manner similar to the description given above for the first entry.

Provision of a host bridge 202 to implement the wait requirements listed in the table of FIG. 28, along with provision of a posted command virtual channel in the coherent fabric, ensures that the ordering requirements for posted write requests within the coherent fabric can be met. Ordering requirements for posted write requests on the noncoherent fabric may be met by using the PassPW bit, as described above. As described above with respect to FIG. 9, the following four requirements apply to posted writes on the PCI bus in the I/O subsystem:

(i) posted writes from the same source remain in order on the target interface;

(ii) posted writes followed by a read from the same source are completed on the target interface before the read data is returned;

(iii) non-posted writes may not pass posted writes from the same source; and (iv) posted writes must be allowed to pass prior non-posted operations.

Requirement (i) is satisfied for posted write requests directed to the same coherent target node by placing the posted write request packets in the posted command virtual channel, along with applying the wait requirements of entry 272 of table 270 to posted write requests directed to different coherent target nodes. Requirement (ii) may be satisfied by applying the wait requirements of entry 274 of table 270. Requirement (iii) also may be satisfied by applying the wait requirements of entry 272. Finally, requirement (iv) may be satisfied by employing the posted commands virtual channel. For each of requirements (i)–(iv), it is assumed that the PassPW bit in the second packet is clear. Otherwise, if the PassPW bits is set, the second packet may be allowed pass the first packet. Other entries within table 270 may be used to provide ordering of other types of requests within the coherent fabric which have been sourced on the noncoherent link.

Numerous variations and modifications will become apparent to those skilled in the art once the above disclosure is fully appreciated. It is intended that the following claims be interpreted to embrace all such variations and modifications.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising:
a first node of a plurality of nodes in a computer system transmitting a posted request packet, the plurality of nodes implementing a plurality of virtual channels to communicate packets between the nodes, wherein the plurality of virtual channels comprises a posted command virtual channel dedicated to posted request packets, and wherein a given posted request packet communicates a request that is considered completed by a source of the request upon transmission of the request by the source, and wherein transmitting the posted request packet comprises transmitting on the posted command virtual channel; and
receiving the posted request packet in a second node of the plurality of nodes.

2. The method as recited in claim 1 wherein the plurality of virtual channels further comprises a non-posted command virtual channel dedicated to non-posted request packets, wherein a given non-posted request packet communicates a request that is not completed by the source of the request until the request is completed at a target of the request, the method further comprising the first node transmitting a non-posted request packet on the non-posted command virtual channel.

3. The method as recited in claim 2 wherein the plurality of virtual channels further comprises a response virtual channel to communicate response packets, wherein the method further comprises the first node transmitting a response packet on the response virtual channel.

4. The method as recited in claim 3 wherein the plurality of virtual channels further comprises a probe virtual channel, the method further comprising the first node transmitting a probe packet on the probe virtual channel.

5. The method as recited in claim 1 further comprising the second node storing the posted request packet in a first packet buffer within the second node.

6. The method as recited in claim 5 wherein the first packet buffer is dedicated to the posted command virtual channel.

7. The method as recited in claim 1 wherein the posted request packet corresponds to a write operation, the method further comprising the first node transmitting the write data corresponding to the write operation on the posted command virtual channel.

8. The method as recited in claim 1 further comprising:
the first node transmitting a second packet in one of the plurality of virtual channels other than the posted command virtual channel, wherein the second packet is defined to push posted request packets; and
the second node processing the posted request packet prior to the second packet responsive to the second packet being defined to push the posted request packet.

9. The method as recited in claim 8 wherein the second packet includes a sequence identification number, and wherein the posted request packet also includes a sequence identification number, and wherein the second packet is defined to push the posted request packet if the sequence identification numbers are equal and non-zero.

10. The method as recited in claim 8 wherein the second packet includes a pass posted indication indicating whether or not the second packet is permitted to pass posted requests, and wherein the second packet is defined to push the posted request packet if the pass posted indication is in a state indicating that the second packet is not permitted to pass posted requests.

11. The method as recited in claim 8 wherein the second packet includes a flush command.

12. A computer system comprising a plurality of nodes including a first node and a second node coupled to the first node, wherein the plurality of nodes implement a plurality of virtual channels to communicate packets between nodes, and wherein the plurality of virtual channels comprises a posted command virtual channel dedicated to posted request packets, and wherein a given posted request packet communicates a request that is considered completed by a source of the request upon transmission of the request by the source, wherein the first node is configured to transmit a posted request packet on the posted command virtual channel, and wherein the second node is coupled to receive the posted request packet.

13. The computer system as recited in claim 12 wherein the plurality of virtual channels further comprises a non-posted command virtual channel dedicated to non-posted request packets, wherein a given non-posted request packet communicates a request that is not completed by the source of the request until the request is completed at a target of the request, wherein the first node is configured to transmit a non-posted request packet on the non-posted command virtual channel.

14. The computer system as recited in claim 13 wherein the plurality of virtual channels further comprises a response virtual channel to communicate response packets, and wherein the first node is configured to transmit a response packet on the response virtual channel.

15. The computer system as recited in claim 14 wherein the plurality of virtual channels further comprises a probe virtual channel, and wherein the first node is configured to transmit a probe packet on the probe virtual channel.

16. The computer system as recited in claim 12 wherein the second node is configured to store the posted request packet in a first packet buffer within the second node.

17. The computer system as recited in claim 16 wherein the first packet buffer is dedicated to the posted command virtual channel.

18. The computer system as recited in claim 12 wherein the posted request packet corresponds to a write operation, and wherein the first node is configured to transmit the write data corresponding to the write operation on the posted command virtual channel.

19. The computer system as recited in claim 12 wherein the first node is configured to transmit a second packet in one of the plurality of virtual channels other than the posted command virtual channel, wherein the second packet is defined to push posted request packets, and wherein the second node is configured to process the posted request packet prior to the second packet responsive to the second packet being defined to push the posted request packet.

20. The computer system as recited in claim 19 wherein the second packet includes a sequence identification number, and wherein the posted request packet also includes a sequence identification number, and wherein the second packet is defined to push the posted request packet if the sequence identification numbers are equal and non-zero.

21. The computer system as recited in claim 19 wherein the second packet includes a pass posted indication indicating whether or not the second packet is permitted to pass posted requests, and wherein the second packet is defined to push the posted request packet if the pass posted indication is in a state indicating that the second packet is not permitted to pass posted requests.

22. The computer system as recited in claim 19 wherein the second packet includes a flush command.

23. A node for a computer system, the node comprising circuitry configured to transmit a posted request packet on a posted command virtual channel of a plurality of virtual channels implemented by the node to communicate with other nodes, wherein the posted command virtual channel is dedicated to posted request packets, and wherein a given posted request packet communicates a request that is considered completed by a source of the request upon transmission of the request by the source.

24. The node as recited in claim 23 wherein the plurality of virtual channels further comprises a non-posted command virtual channel dedicated to non-posted request packets, wherein a given non-posted request packet communicates a request that is not completed by the source of the request until the request is completed at a target of the request, and wherein the circuitry is configured to transmit a non-posted request packet on the non-posted command virtual channel.

25. The node as recited in claim 24 wherein the plurality of virtual channels further comprises a response virtual channel to communicate response packets, and wherein the circuitry is configured to transmit a response packet on the response virtual channel.

26. The node as recited in claim 25 wherein the plurality of virtual channels further comprises a probe virtual channel, and wherein the circuitry is configured to transmit a probe packet on the probe virtual channel.

27. The node as recited in claim 23 wherein the posted request packet corresponds to a write operation, and wherein the circuitry is configured to transmit the write data corresponding to the write operation on the posted command virtual channel.

28. The node as recited in claim 23 wherein the circuitry is configured to transmit a second packet in one of the plurality of virtual channels other than the posted command virtual channel, wherein the second packet is defined to push posted request packets, and wherein the posted request packet is processed prior to the second packet responsive to the second packet being defined to push the posted request packet.

29. The node as recited in claim 28 wherein the second packet includes a sequence identification number, and wherein the posted request packet also includes a sequence identification number, and wherein the second packet is defined to push the posted request packet if the sequence identification numbers are equal and non-zero.

30. The node as recited in claim 28 wherein the second packet includes a pass posted indication indicating whether or not the second packet is permitted to pass posted requests, and wherein the second packet is defined to push the posted request packet if the pass posted indication is in a state indicating that the second packet is not permitted to pass posted requests.

31. The node as recited in claim 28 wherein the second packet includes a flush command.

* * * * *